United States Patent
Freishtat et al.

(10) Patent No.: US 7,552,190 B1
(45) Date of Patent: Jun. 23, 2009

(54) SYSTEM AND METHOD FOR AUTOMATED ELECTRONIC NOTIFICATION AND TRANSACTION EXECUTION

(75) Inventors: Gregg Freishtat, Atlanta, GA (US); Palaniswamy Rajan, Atlanta, GA (US)

(73) Assignee: VerticalOne Corporation, Atlanta, GA (US)

(*) Notice: Subject to any disclaimer, the term of this patent is extended or adjusted under 35 U.S.C. 154(b) by 0 days.

(21) Appl. No.: 09/427,790

(22) Filed: Oct. 27, 1999

Related U.S. Application Data

(60) Provisional application No. 60/134,395, filed on May 17, 1999, provisional application No. 60/105,917, filed on Oct. 28, 1998.

(51) Int. Cl.
G06F 15/16 (2006.01)
G06F 15/173 (2006.01)

(52) U.S. Cl. .................. 709/217; 709/201; 709/203; 709/223

(58) Field of Classification Search .............. 705/14, 705/24, 30, 35, 39, 44, 50; 707/9, 10; 709/201, 709/202, 203, 204–207, 217, 218, 225, 227, 709/229, 224, 219, 223
See application file for complete search history.

(56) References Cited

U.S. PATENT DOCUMENTS

| | | |
|---|---|---|
| 4,727,243 A | 2/1988 | Savar |
| 4,987,538 A | 1/1991 | Johnson et al. |
| 5,220,501 A | 6/1993 | Lawlor et al. |
| 5,237,499 A | 8/1993 | Garback |
| 5,318,007 A | 6/1994 | Afshar |
| 5,340,537 A | 8/1994 | Barrett |
| 5,347,632 A | 9/1994 | Filepp et al. |
| 5,446,891 A | 8/1995 | Kaplan et al. |
| 5,459,306 A | 10/1995 | Stein et al. |

(Continued)

FOREIGN PATENT DOCUMENTS

EP 0 786 728 7/1997

(Continued)

OTHER PUBLICATIONS

"Collapsible User Interfaces for Information Retrieval Agents," Martin Frank and Pedro Szekely, Proceedings of International Conference on Intelligent User Interfaces, Jan. 5-8, 1999, Redondo, CA, pp. 15-22.

(Continued)

*Primary Examiner*—William C Vaughn, Jr
*Assistant Examiner*—Kristie D Shingles
(74) *Attorney, Agent, or Firm*—Ballard Spahr Andrews & Ingersoll, LLP

(57) ABSTRACT

This invention is a system and method for automated notification of occurrences of events related to personal information and/or the automated execution of transactions involving personal information based on events related to the personal information. A user profile associated with each end user of personal information is scanned to determine whether any trigger event related to the personal information associated with each end user has occurred. For each trigger event found to have occurred, a response associated with the found trigger event is executed. The response will be notification to the end user of the occurrence of the trigger event, the execution of a transaction involving personal information of the end user for whom the trigger event occurred or a combination of notification and execution.

16 Claims, 11 Drawing Sheets

U.S. PATENT DOCUMENTS

| | | | |
|---|---|---|---|
| 5,481,672 A | 1/1996 | Okuno et al. | |
| 5,483,445 A * | 1/1996 | Pickering | 705/40 |
| 5,537,314 A | 7/1996 | Kanter | |
| 5,590,196 A * | 12/1996 | Moreau | 705/78 |
| 5,613,012 A | 3/1997 | Hoffman et al. | |
| 5,619,648 A | 4/1997 | Canale et al. | |
| 5,619,716 A | 4/1997 | Nonaka et al. | |
| 5,634,127 A | 5/1997 | Cloud et al. | |
| 5,640,577 A | 6/1997 | Scharmer | |
| 5,644,576 A | 7/1997 | Bauchot et al. | |
| 5,649,118 A | 7/1997 | Carlisle et al. | 395/241 |
| 5,649,186 A | 7/1997 | Ferguson | |
| 5,655,089 A | 8/1997 | Bucci | 395/240 |
| 5,696,965 A | 12/1997 | Dedrick | |
| 5,699,528 A | 12/1997 | Hogan | 395/240 |
| 5,701,451 A | 12/1997 | Rogers et al. | |
| 5,706,442 A | 1/1998 | Anderson et al. | |
| 5,708,825 A | 1/1998 | Sotomayor | |
| 5,710,887 A | 1/1998 | Chelliah et al. | 395/226 |
| 5,710,918 A | 1/1998 | Lagarde et al. | |
| 5,712,979 A | 1/1998 | Graber et al. | |
| 5,717,923 A | 2/1998 | Dedrick | |
| 5,721,908 A | 2/1998 | Lagarde et al. | |
| 5,724,567 A * | 3/1998 | Rose et al. | 345/716 |
| 5,724,595 A | 3/1998 | Gentner | |
| 5,727,156 A | 3/1998 | Herr-Hoyman et al. | |
| 5,732,074 A | 3/1998 | Spaur et al. | |
| 5,740,365 A | 4/1998 | Pfeiffer et al. | |
| 5,740,549 A | 4/1998 | Reilly et al. | |
| 5,745,754 A | 4/1998 | Lagarde et al. | |
| 5,745,884 A | 4/1998 | Carnegie et al. | |
| 5,752,246 A | 5/1998 | Rogers et al. | |
| 5,768,521 A | 6/1998 | Dedrick | |
| 5,768,577 A | 6/1998 | Kleewein et al. | |
| 5,778,367 A | 7/1998 | Wesinger, Jr. et al. | |
| 5,787,425 A | 7/1998 | Bigus | |
| 5,790,793 A | 8/1998 | Higley | |
| 5,793,964 A | 8/1998 | Rogers et al. | |
| 5,793,966 A | 8/1998 | Amstein et al. | |
| 5,794,233 A | 8/1998 | Rubinstein | |
| 5,796,945 A | 8/1998 | Tarabella | |
| 5,799,151 A | 8/1998 | Hoffer | |
| 5,812,769 A | 9/1998 | Graber et al. | |
| 5,813,007 A * | 9/1998 | Nielsen | 707/10 |
| 5,815,665 A | 9/1998 | Teper et al. | |
| 5,818,935 A | 10/1998 | Maa | |
| 5,819,284 A | 10/1998 | Farber | |
| 5,825,884 A | 10/1998 | Zdepski et al. | 380/25 |
| 5,828,839 A | 10/1998 | Moncreiff | |
| 5,832,474 A | 11/1998 | Lopresti et al. | |
| 5,832,494 A | 11/1998 | Egger et al. | |
| 5,835,724 A | 11/1998 | Smith | |
| 5,838,910 A | 11/1998 | Domenikos et al. | |
| 5,838,916 A | 11/1998 | Domenikos et al. | |
| 5,838,918 A | 11/1998 | Prager et al. | |
| 5,845,073 A | 12/1998 | Carlin et al. | |
| 5,848,396 A | 12/1998 | Gerace | 705/10 |
| 5,854,897 A | 12/1998 | Radziewicz et al. | |
| 5,855,015 A | 12/1998 | Shoham | |
| 5,860,068 A | 1/1999 | Cook | 705/26 |
| 5,860,073 A | 1/1999 | Ferrel et al. | |
| 5,862,325 A * | 1/1999 | Reed et al. | 709/201 |
| 5,870,552 A | 2/1999 | Dozier et al. | |
| 5,875,296 A | 2/1999 | Shi et al. | |
| 5,878,215 A * | 3/1999 | Kling et al. | 709/207 |
| 5,878,219 A | 3/1999 | Vance, Jr. et al. | 395/200.47 |
| 5,884,033 A | 3/1999 | Duvall et al. | |
| 5,884,035 A | 3/1999 | Butman et al. | |
| 5,884,045 A | 3/1999 | Kurihara | 395/200.67 |
| 5,887,133 A | 3/1999 | Brown et al. | |
| 5,890,140 A | 3/1999 | Clark et al. | |
| 5,890,152 A | 3/1999 | Rapaport et al. | |
| 5,892,900 A | 4/1999 | Ginter et al. | |
| 5,892,909 A | 4/1999 | Grasso et al. | |
| 5,893,075 A | 4/1999 | Plainfield et al. | |
| 5,893,091 A | 4/1999 | Hunt et al. | |
| 5,893,128 A | 4/1999 | Nauckhoff | |
| 5,894,554 A | 4/1999 | Lowery et al. | 395/200.33 |
| 5,895,468 A | 4/1999 | Whitmyer, Jr. | 707/10 |
| 5,897,620 A | 4/1999 | Walker et al. | |
| 5,897,622 A | 4/1999 | Blinn et al. | 705/26 |
| 5,898,836 A | 4/1999 | Freivald et al. | 395/200.48 |
| 5,901,287 A | 5/1999 | Bull | |
| 5,903,881 A | 5/1999 | Schrader et al. | |
| 5,905,736 A | 5/1999 | Ronen et al. | |
| 5,905,865 A | 5/1999 | Palmer et al. | |
| 5,907,837 A | 5/1999 | Ferrel et al. | |
| 5,907,838 A * | 5/1999 | Miyasaka et al. | 707/10 |
| 5,908,469 A | 6/1999 | Botz et al. | |
| 5,913,202 A | 6/1999 | Motoyama | |
| 5,918,019 A | 6/1999 | Valencia | |
| 5,918,214 A | 6/1999 | Perkowski | 705/27 |
| 5,920,848 A | 7/1999 | Schutzer et al. | |
| 5,923,736 A | 7/1999 | Shachar | |
| 5,924,090 A | 7/1999 | Krellenstein | |
| 5,926,798 A | 7/1999 | Carter | 705/26 |
| 5,930,777 A | 7/1999 | Barber | |
| 5,931,907 A | 8/1999 | Davies et al. | |
| 5,931,947 A | 8/1999 | Burns et al. | |
| 5,933,604 A | 8/1999 | Inakoshi | |
| 5,933,811 A | 8/1999 | Angles et al. | |
| 5,933,816 A | 8/1999 | Zeanah et al. | |
| 5,937,168 A | 8/1999 | Anderson et al. | |
| 5,937,392 A | 8/1999 | Alberts | |
| 5,943,424 A | 8/1999 | Berger et al. | |
| 5,948,040 A | 9/1999 | DeLorme et al. | |
| 5,949,326 A * | 9/1999 | Wicks et al. | 340/286.01 |
| 5,951,637 A | 9/1999 | Kuzma | |
| 5,951,642 A | 9/1999 | Onoe et al. | |
| 5,956,709 A | 9/1999 | Xue | 707/3 |
| 5,961,593 A | 10/1999 | Gabber et al. | |
| 5,961,601 A | 10/1999 | Iyengar | |
| 5,963,915 A | 10/1999 | Kirsch | 705/26 |
| 5,963,924 A | 10/1999 | Williams et al. | |
| 5,963,925 A | 10/1999 | Kolling et al. | |
| 5,963,949 A | 10/1999 | Gupta et al. | |
| 5,963,952 A | 10/1999 | Smith | |
| 5,963,967 A | 10/1999 | Umen et al. | |
| 5,966,441 A | 10/1999 | Calamera | |
| 5,966,697 A | 10/1999 | Fergerson et al. | |
| 5,974,406 A | 10/1999 | Bisdikian et al. | |
| 5,974,430 A | 10/1999 | Mutschler et al. | |
| 5,978,766 A | 11/1999 | Luciw | 705/1 |
| 5,978,779 A | 11/1999 | Stein et al. | |
| 5,978,780 A * | 11/1999 | Watson | 705/40 |
| 5,978,828 A | 11/1999 | Greer et al. | |
| 5,978,842 A | 11/1999 | Noble | |
| 5,982,891 A | 11/1999 | Ginter et al. | |
| 5,983,170 A | 11/1999 | Goodman | |
| 5,983,200 A | 11/1999 | Slotznick | 705/26 |
| 5,983,214 A | 11/1999 | Lang et al. | |
| 5,983,227 A * | 11/1999 | Nazem et al. | 705/1 |
| 5,983,268 A | 11/1999 | Freivald | |
| 5,987,440 A * | 11/1999 | O'Neil et al. | 705/44 |
| 5,987,454 A | 11/1999 | Hobbs | |
| 5,987,466 A | 11/1999 | Greer et al. | |
| 5,987,498 A | 11/1999 | Athing et al. | 709/203 |
| 5,987,611 A | 11/1999 | Freund | |
| 5,990,887 A | 11/1999 | Redpath et al. | |
| 5,991,735 A | 11/1999 | Gerace | 705/10 |
| 5,991,756 A | 11/1999 | Wu | 707/3 |
| 5,995,943 A | 11/1999 | Bull | |
| 5,995,965 A | 11/1999 | Experton | |
| 5,999,940 A | 12/1999 | Ranger | |

| | | | |
|---|---|---|---|
| 5,999,975 A * | 12/1999 | Kittaka et al. ............... 709/217 |
| 6,000,033 A | 12/1999 | Kelley et al. |
| 6,000,832 A | 12/1999 | Franklin et al. |
| 6,003,077 A | 12/1999 | Bawden et al. |
| 6,006,227 A | 12/1999 | Freeman et al. |
| 6,006,333 A | 12/1999 | Nielsen |
| 6,009,408 A | 12/1999 | Buchanan |
| 6,014,429 A | 1/2000 | LaPorta et al. |
| 6,014,502 A | 1/2000 | Moraes |
| 6,018,724 A | 1/2000 | Arent .......................... 705/44 |
| 6,023,684 A | 2/2000 | Pearson |
| 6,023,698 A | 2/2000 | Lavey |
| 6,029,175 A * | 2/2000 | Chow et al. ............... 707/104.1 |
| 6,029,180 A | 2/2000 | Murata et al. |
| 6,029,182 A | 2/2000 | Nehab et al. |
| 6,029,195 A | 2/2000 | Herz |
| 6,031,354 A | 2/2000 | Wiley et al. |
| 6,032,162 A | 2/2000 | Burke |
| 6,038,601 A | 3/2000 | Lambert et al. |
| 6,038,668 A | 3/2000 | Chipman et al. |
| 6,041,307 A | 3/2000 | Ahuja et al. |
| 6,041,326 A | 3/2000 | Amro et al. |
| 6,044,372 A | 3/2000 | Rothfus et al. |
| 6,044,465 A | 3/2000 | Dutcher et al. |
| 6,055,236 A | 4/2000 | Nessett et al. |
| 6,055,570 A | 4/2000 | Nielsen |
| 6,058,417 A | 5/2000 | Hess et al. |
| 6,061,716 A | 5/2000 | Moncreiff |
| 6,064,985 A * | 5/2000 | Anderson .................... 705/36 |
| 6,065,120 A | 5/2000 | Laursen et al. |
| 6,070,150 A | 5/2000 | Remington et al. |
| 6,073,173 A | 6/2000 | Bittinger et al. |
| 6,078,907 A | 6/2000 | Lamm ........................ 705/40 |
| 6,078,924 A | 6/2000 | Ainsbury et al. |
| 6,078,929 A | 6/2000 | Rao |
| 6,081,830 A | 6/2000 | Schindler |
| 6,085,188 A | 7/2000 | Bachmann et al. |
| 6,085,229 A | 7/2000 | Newman et al. |
| 6,085,238 A | 7/2000 | Yuasa et al. |
| 6,088,711 A | 7/2000 | Fein et al. |
| 6,088,722 A | 7/2000 | Herz et al. |
| 6,101,500 A | 8/2000 | Lau |
| 6,108,686 A | 8/2000 | Williams, Jr. |
| 6,108,691 A | 8/2000 | Lee et al. |
| 6,112,212 A | 8/2000 | Heitler |
| 6,119,079 A | 9/2000 | Wang et al. |
| 6,119,098 A | 9/2000 | Guyot et al. |
| 6,119,101 A | 9/2000 | Peckover |
| 6,119,229 A | 9/2000 | Martinez et al. |
| 6,122,673 A | 9/2000 | Basak et al. |
| 6,125,186 A | 9/2000 | Saito et al. |
| 6,125,352 A | 9/2000 | Franklin et al. |
| 6,128,603 A | 10/2000 | Dent et al. |
| 6,128,624 A | 10/2000 | Papierniak et al. |
| 6,128,655 A | 10/2000 | Fields et al. |
| 6,131,115 A | 10/2000 | Anderson et al. |
| 6,134,532 A | 10/2000 | Lazarus et al. |
| 6,134,534 A | 10/2000 | Walker et al. |
| 6,134,548 A | 10/2000 | Gottsman et al. |
| 6,134,658 A | 10/2000 | Multerer et al. |
| 6,138,155 A | 10/2000 | Davis et al. |
| 6,138,158 A | 10/2000 | Boyle |
| 6,141,333 A | 10/2000 | Chavez, Jr. |
| 6,141,651 A | 10/2000 | Riley et al. |
| 6,147,975 A | 11/2000 | Bowman-Amuah |
| 6,148,402 A | 11/2000 | Campbell |
| 6,157,924 A | 12/2000 | Austin |
| 6,169,992 B1 | 1/2001 | Beall et al. |
| 6,172,677 B1 | 1/2001 | Stautner et al. |
| 6,181,786 B1 | 1/2001 | Detampel et al. |
| 6,182,085 B1 | 1/2001 | Eichstaedt |
| 6,182,142 B1 | 1/2001 | Win |
| 6,182,229 B1 | 1/2001 | Nielsen |
| 6,185,601 B1 | 2/2001 | Wolff |
| 6,192,380 B1 | 2/2001 | Light et al. |
| 6,192,407 B1 | 2/2001 | Smith et al. |
| 6,195,651 B1 | 2/2001 | Handel et al. |
| 6,199,077 B1 | 3/2001 | Inala et al. |
| 6,199,079 B1 | 3/2001 | Gupta et al. |
| 6,199,082 B1 | 3/2001 | Ferrel et al. |
| 6,199,099 B1 | 3/2001 | Gershman et al. |
| 6,199,113 B1 | 3/2001 | Alegre et al. |
| 6,202,062 B1 | 3/2001 | Cameron et al. |
| 6,202,210 B1 | 3/2001 | Ludtke |
| 6,205,433 B1 | 3/2001 | Boesch |
| 6,205,456 B1 | 3/2001 | Nakao |
| 6,205,473 B1 | 3/2001 | Thomasson et al. |
| 6,208,975 B1 | 3/2001 | Bull |
| 6,212,548 B1 | 4/2001 | DeSimone et al. |
| 6,219,705 B1 | 4/2001 | Steinberger et al. |
| 6,223,292 B1 | 4/2001 | Dean et al. |
| 6,226,648 B1 | 5/2001 | Appleman et al. |
| 6,226,750 B1 | 5/2001 | Trieger |
| 6,233,592 B1 | 5/2001 | Schnelle et al. |
| 6,233,608 B1 | 5/2001 | Laursen et al. |
| 6,236,991 B1 * | 5/2001 | Frauenhofer et al. .......... 705/10 |
| 6,237,096 B1 | 5/2001 | Bisbee et al. |
| 6,240,443 B1 | 5/2001 | Suzuki et al. |
| 6,243,755 B1 | 6/2001 | Takagi et al. |
| 6,252,544 B1 | 6/2001 | Hoffberg |
| 6,253,188 B1 | 6/2001 | Witek et al. |
| 6,253,326 B1 | 6/2001 | Lincke et al. |
| 6,260,039 B1 | 7/2001 | Schneck et al. |
| 6,263,501 B1 | 7/2001 | Schein et al. |
| 6,266,615 B1 | 7/2001 | Jin |
| 6,271,840 B1 | 8/2001 | Finseth et al. |
| 6,278,993 B1 | 8/2001 | Kumar et al. |
| 6,279,037 B1 | 8/2001 | Tams et al. |
| 6,282,278 B1 | 8/2001 | Doganata et al. |
| 6,286,029 B1 | 9/2001 | Delph |
| 6,286,043 B1 | 9/2001 | Cuomo et al. |
| 6,289,389 B1 | 9/2001 | Kikinis |
| 6,292,787 B1 | 9/2001 | Scott et al. |
| 6,301,584 B1 | 10/2001 | Ranger |
| 6,301,621 B1 | 10/2001 | Haverstock et al. |
| 6,304,860 B1 | 10/2001 | Martin, Jr. et al. ............ 705/43 |
| 6,317,718 B1 | 11/2001 | Fano |
| 6,317,783 B1 | 11/2001 | Freishtat et al. |
| 6,324,538 B1 | 11/2001 | Wesinger, Jr. et al. |
| 6,324,569 B1 | 11/2001 | Ogilvie et al. |
| 6,330,321 B2 | 12/2001 | Detampel, Jr. et al. |
| 6,330,561 B1 | 12/2001 | Cohen et al. |
| 6,330,592 B1 | 12/2001 | Makuch et al. |
| 6,339,761 B1 | 1/2002 | Cottingham |
| 6,341,353 B1 | 1/2002 | Herman et al. |
| 6,345,300 B1 | 2/2002 | Bakshi et al. |
| 6,349,257 B1 | 2/2002 | Liu et al. |
| 6,349,307 B1 | 2/2002 | Chen |
| 6,351,464 B1 | 2/2002 | Galvin et al. |
| 6,356,834 B2 | 3/2002 | Hancock et al. |
| 6,356,899 B1 | 3/2002 | Chakrabarti et al. |
| 6,356,905 B1 | 3/2002 | Gershman et al. |
| 6,360,205 B1 | 3/2002 | Iyengar |
| 6,366,923 B1 * | 4/2002 | Lenk et al. .................... 707/1 |
| 6,377,567 B1 | 4/2002 | Leonard |
| 6,377,993 B1 | 4/2002 | Brandt et al. |
| 6,380,890 B1 | 4/2002 | Smith et al. |
| 6,385,595 B1 | 5/2002 | Kolling et al. ................ 705/40 |
| 6,385,655 B1 | 5/2002 | Smith et al. |
| 6,397,212 B1 | 5/2002 | Biffar |
| 6,405,245 B1 | 6/2002 | Burson et al. |
| 6,412,073 B1 | 6/2002 | Rangan |
| 6,424,979 B1 | 7/2002 | Livingston et al. |
| 6,438,580 B1 | 8/2002 | Mears et al. |
| 6,442,590 B1 | 8/2002 | Inala et al. |
| 6,473,740 B2 | 10/2002 | Cockrill et al. |

| | | | |
|---|---|---|---|
| 6,484,155 B1 | 11/2002 | Kiss | |
| 6,499,036 B1 | 12/2002 | Gurevich | 707/103 R |
| 6,516,303 B1 * | 2/2003 | Wallman | 705/36 T |
| 6,567,850 B1 | 5/2003 | Freishtat | |
| 6,694,546 B1 | 2/2004 | Kasem | |
| 6,717,376 B2 * | 4/2004 | Lys et al. | 315/292 |
| 6,801,929 B1 * | 10/2004 | Donoho et al. | 709/204 |
| 6,802,042 B2 | 10/2004 | Rangan | |
| 6,847,988 B2 * | 1/2005 | Toyouchi et al. | 709/203 |
| 2001/0000537 A1 | 4/2001 | Inala et al. | |
| 2001/0016034 A1 | 8/2001 | Singh et al. | |
| 2001/0020242 A1 | 9/2001 | Gupta et al. | |
| 2001/0023414 A1 | 9/2001 | Kumar et al. | |
| 2001/0032182 A1 | 10/2001 | Kumar et al. | |
| 2001/0037294 A1 | 11/2001 | Freishtat et al. | |
| 2001/0051907 A1 | 12/2001 | Kumar et al. | |
| 2002/0002536 A1 | 1/2002 | Braco | 705/40 |
| 2002/0007330 A1 | 1/2002 | Kumar et al. | |
| 2002/0015480 A1 | 2/2002 | Neil et al. | |
| 2002/0019810 A1 | 2/2002 | Kumar et al. | |
| 2002/0023104 A1 | 2/2002 | Satyavolu et al. | |
| 2002/0059369 A1 | 5/2002 | Kern et al. | |
| 2002/0082990 A1 | 6/2002 | Jones | 705/40 |
| 2002/0095651 A1 | 7/2002 | Kumar et al. | |

FOREIGN PATENT DOCUMENTS

| | | |
|---|---|---|
| EP | 0786728 A1 | 7/1997 |
| EP | 0 848 338 | 6/1998 |
| EP | 0848338 A1 | 6/1998 |
| JP | 7074817 | 3/1975 |
| WO | WO 97/16796 | 5/1997 |
| WO | WO 97/37314 | 10/1997 |
| WO | WO 98/28698 | 7/1998 |
| WO | WO01/33759 A1 | 5/2001 |

OTHER PUBLICATIONS

"A Softbot-based Interface to the Internet," Oren Etzioni and Daniel Weld, Communication of the ACM, vol. 37, No. 7, Jul. 1994, pp. 72-76.
"Strategic Directions in Database Systems—Breaking Out of the Box," Avi Silberschatz and Stan Zdonik et al., ACM Computing Surveys, vol. 28, No. 4, pp. 764-778, Dec. (1996).
"Database Security and Privacy," Sushil Jajodia, ACM Computing Surveys, vol. 28, Issue 1, pp. 129-131, Mar. (1996).
"Managing Security and Privacy of Information," Sushil Jajodia, ACM Computing Surveys, vol. 28, Issue 4es, Dec. (1996).
Unknown, Roboword, Multilingual Dictionary Tool, Jul. 27, 1997, pp. 1-3, all.
Chaum, D. Security without identification: transacti on systems to make big brother obsolete. Communication of the ACM. Oct. 1985. vol. 28. Issue 10 pp. 1030-1044.
Stanley, Tracey, "Intelligent Searching Agents on the Web", Jan. 1997, 4 pages, <http://www.ariadne.ac.uk/issue7/search -engines/>.
Jansen, James, "Using an Intelligent Agent to Enchance Search Engine Performance", Dec. 1998, 13 pages, <http://www.firstmonday.dk/issues/issue2_3/jansen/>.
Lesser, Victor et al., "Big: A Resource_Bounded Information Gathering Agent", Jan. 1998, 18 pages <http://dis.cs.umass.edu/research/big/>.
Severance, C., Could LDAP be the next killer DAP?, IEEE Computer, vol. 30, Issue 8, Aug. 1997, pp. 88-89.
Gardner, Stephen R., Building the data warehouse, Communications of the ACM, vol. 41, Issue 9, Sep. 1998, pp. 52-60.
Bontepo, Charles et al., The IBM data warehouse, Communications of the ACM, vol. 41, Issue 9, Sep. 1998, pp. 38-48.
Fryer et al. (Eds.) Microsoft Computer Dictionary, 1997, 3 rd Edition, pp. 238-240, 487.
Mollohan, Gary, Wireless Revolution,: Appliance. Aug 1999. vol. 56. No. 8, p. 49.
Anonymous. Dialog file 20 (World Reporter). No. 3629961. 3Com Announces the Pal, VII Connected Organizer, the First Handheld Solution for Out-Of-The-Box Wireless Internet Access. Business Wire. Dec. 2, 1998. 4 pages, especially p. 1, lines 18 -33, p. 2, lines 1-10, p. 3, lines 21-30 and p. 4, lines 2-17 and lines 21-24.
Chakrabarti et al., Mining the Web's link structure, Computer, Aug. 1999, pp. 60-67.
Das et al., Experiments in using agent-based retrieval from distributed heterogeneous database, Knowledge and Data Engineering Exchange Works, Nov. 1997, abstract.
Frecon, Webpath-a three dimensional Web history, Information Visualization IEEE Symposium on Oct. 1998, pp. 3 -10.
Park, Intelligent query and browsing information retrieval (QBIR) agent, Acoustics, Speech and Signal Processing, IEEE International Conference, May 1998, pp. 1173-1176.
O'Leary, Mick, "NewsWorks, brings new depth to Web news; the site excels with unique sources and value -added editorial features", Information Today, v 14, p. 10.
Pelline, LookSmart to be ISP home page, Web page, unverified print date of Sep. 22, 2000, unverified cover date of Aug. 14, 1997.
Macavinta, Excite, Lycos get more personal, Web page, unverified print date of Sep. 22, 2000, unverified cover date of Apr. 13, 1998.
Masao ITO, "Product Review WWW Autopilot Software Naminoriyaro Enterprise", Nikkei Windows NT, No. 19, Nikkei BP, Oct. 1, 1998, pp. 26-28 (JPO CSDB Literature No.: National Technical Journal 1998-01804-002).
Masaya Suzuki, "Naminoriyaro Enterprise Ver. 1.0", ASCII NT, vol. 3, No. 10, ASCII Corporation, Oct. 1, 1998, pp. 118-119 (JPO CSDB Literature No.: National Technical Journal 1998-01100-010).
"Naminoriyaro Plays an Active Role in Small Offices", Inter-Net magazine, No. 44, Impress Corporation, Sep. 1, 1998, p. 237 (JPO CSDB Literature No.: National Technical Journal 2000-00181-017).
"Autopilot Software Requires No Waiting Time", ASCII DOS/V ISSUE, vol. 4, No. 10, ASCII Corporation, Oct. 1, 1998, pp. 190-191 (JPO CSDB Literature No.: National Technical Journal 1998-01798-011).
"Introduction to Outdoor Network", DOS/V magazine, vol. 6, No. 10, Soft Bank Corporation, May 15, 1997, pp. 144-155 (JPO CSDB Literature No.: National Technical Journal 1998-01206-003).
Tadatoshi Hirono, "Have a Lead on Active Web Pages! No. 9", Internet ASCII, vol. 3, No. 4, ASCII Corporation, Apr. 1, 1998, pp. 390-391 (JPO CSDB Literature No.: National Technical Journal 2000-00394-027).
Kazuya Ishikawa, "What is a "cookie" which you see on WWW browsers?", Internet magazine, No. 39, Impress Corporation, Apr. 1, 1998, pp. 216-217 (JPO CSDB Literature No.: National Technical Journal 2000-00176-008).
Jun Nakajima, "Internet Techniques for Beginners No. 9", In-terface, vol. 24, No. 9, CQ Publishing Co., Ltd., Sep. 1, 1998, pp. 72-76 (JPO CSDB Literature No.: National Technical Journal 1998-01164-001).
Shiro IBA, What is it? Explorer File No. 7 "How much is the ease of use of Internet banking?", SOHO Computing, vol. 3, No. 9, Cybiz Co., Ltd, Jun. 1, 1998, pp. 55-60 (JPO CSDB Literature No.: National Technical Journal 1998-00782-002).
"NetBill: An Internet Commerce System Optimized for Network-Delivered Services", Marvin Sirbu and J.D. Tygar, IEEE Personal Communications, 2:4, Aug. 1995, pp. 34-39.
Knoblock, C. et al., "Building Agents for Internet-based Supply Chain Integration," University of Southern California, Information Sciences Institute and Integrated Media Systems Center.
Muslea, I. et al., "A Hierarchical Approach to Wrapper Induction," University of Southern California.
Muslea, I. et al., "Wrapper Induction for Semistructured, Web-Based Information Sources," University of Southern California, Information Sciences Institute, the Integrated Media Systems Center, and Computer Science Department.
Ashish, N. et al., "Optimizing Information Agents by Selectively Materializing Data," American Association for Artificial Intelligence (1998).
Knoblock, C. et al., "Modeling Web Sources for Information Integration," American Association for Artificial Intelligence (1997).
Ashish, N. et al., "Intelligent Caching for Information Mediators: A KR Based Approach," University of Southern California, Information Sciences Institute, the Integrated Media Systems Center, and Computer Science Department.

Ashish, N. et al., "Wrapper Generation for Semi-structured Internet Sources," University of Southern California, Information Sciences Institute and Computer Science Department.
Ashish, N. et al., "Semi-automatic Wrapper Generation for Internet Information Sources," University of Southern California, Information Sciences Institute and Computer Science Department.
Frank, M. et al., "An Intelligent User Interface for Mixed-Initiative Multi-Source Travel Planning," Information Sciences Institute, University of Southern California.
Knoblock, C., "Deploying Information Agents on the Web," University of Southern California, Information Sciences Institute and Computer Science Department.
Knoblock, C. et al., "The Ariadne approach to Web-based information integration," University of Southern California, Sep./Oct. 1998.
Notice of Motion, Motion and Memorandum of Points and Authorities in Support of Defendant Cashedge, Inc.'s Motion for Leave to File First Amended Answer and Counterclaims, U.S. District Court, N.D., California, Yodlee v. Cashedge, Inc., Case No. C-05-01550.
Declaration of Jonathan J. Lamberson in Support of Yodlee's Opposition to Cashedge's Motion for Leave to File a First Amended Answer, U.S. District Court, N.D., California, Yodlee v. Cashedge, Inc., Case No. C-05-01550.
Yodlee's Opposition to Cashedge's Motion For Leave to File a First Amended Answer, U.S. District Court, N.D., California, Yodlee v. Cashedge, Inc., Case No. C-05-01550.
Cashedge's Reply Brief in Support of its Motion for Leave to File First Amended Answer and Counterclaims, U.S. District Court, N.D., California, Yodlee v. Cashedge, Inc., Case No. C-05-01550.
Declaration of Richard M. Koehl in Support of Cashedge's Motion for Leave to File First Amended Answer and Counterclaims, U.S. District Court, N.D., California, Yodlee v. Cashedge, Inc., Case No. C-05-01550.
Yodlee's Motion for Leave to File a Sur-reply to Cashedge's Reply Brief in Support of its Motion for Leave to File First Amended Answer and Counterclaims, U.S. District Court, N.D., California, Yodlee v. Cashedge, Inc., Case No. C-05-01550.
Cashedge's Opposition to Yodlee's Motion for Leave to File a Sur-reply, U.S. District Court, N.D., California, Yodlee v. Cashedge, Inc., Case No. C-05-01550.
Declaration of Jonathan J. Lamberson Pursuant to Civil Local Rule 79-5(d) Requesting That Documents Remain Under Seal, U.S. District Court, N.D., California, Yodlee v. Cashedge, Inc., Case No. C-05-01550.
First Amended Answer and Counterclaims; Demand for Jury Trial, U.S. District Court, N.D., California, Yodlee v. Cashedge, Inc., Case No. C-05-01550.
Plaintiff Yodlee, Inc.'s Response to Defendant's First Amended Answer and Counterclaims, U.S. District Court, N.D., California, Yodlee v. Cashedge, Inc., Case No. C-05-01550.
Defendant Cashedge, Inc.'s Notice of Motion, Motion, and Memorandum in Support of Motion for Summary Judgment of Invalidity of the '077 and '783 Patents, U.S. District Court, N.D., California, Yodlee v. Cashedge, Inc., Case No. C-05-01550.
Yodlee's Opposition to Cashedge's Motion for Summary Judgment of Invalidity of the '077 and '783 Patents, U.S. District Court, N.D., California, Yodlee v. Cashedge, Inc., Case No. C-05-01550.
Cashedge's Final Invalidity Contentions, U.S. District Court, N.D., California, Yodlee v. Cashedge, Inc., Case No. C-05-01550.
Defendant Cashedge's Amended Final Invalidity Contentions [Pat. Local Rules 3-3, 3-6, and 3-7], U.S. District Court, N.D., California, Yodlee v. Cashedge, Inc., Case No. C-05-01550.
Zhao, Y., "A Single Login Web Service Integrator—WebEntrance," Mar. 15, 2004.
Omidyar, P., "Automatic Notification of Web Site Changes," Aug. 30, 1995.
Boeing Chooses NetMind Enterprise Minder to Help Thousands of Employees Track Web-Based Information, PR Newswire, (p. 6426), Nov. 19, 1998.
Sullivan, E., "Caravelle's InfoWatcher 1.1 Keeps an Eye on the Web," PC Week, (p. 33), Jul. 14, 1997.
Cognisoft Announces IntelliServ, A Revolutionary Intranet Information Management Application; A Powerful Solution That Enables the Right Information to Find the Right User at the Right Time, Business Wire, (p. 8140125), Aug. 14, 1996.
FirstFloor and AirMedia Announce Partnership; FirstFloor Smart Delivery to Utilize AirMedia Wireless Technologies, Business Wire, (p. 7291077), Jul. 29, 1997.
Fujitsu Announces Availability of ByeDesk Link for Alpha-Numeric Pages; Next Step in Empowering Mobile Workforces with "Anyplace, Anytime" Information, Business Wire, (p. 7091066), Jul. 9, 1998.
Fujitsu Announces "WebAgent" Application as Part of ByeDesk Link Wireless Server Software, Business Wire, (p. 09010210), Sep. 1, 1998.
Fujitsu Picks NetMind for Wireless Web Agent Software, Computergram International, Sep. 2, 1998.
Fujitsu's ByeDesk Link Now Available on the PalmPilot, Business Wire, (p. 1455), Sep. 21, 1998.
GC Tech's GlobeID Payment Internet Commerce Software Supports Microsoft Merchant Server, Business Wire, (p. 1211286), Jan. 21, 1997.
Kravitz, D.W., "Highly Scalable on-Line Payments Via Task Decoupling," Financial Cryptography First International Conference, (p. 355-73), 1997.
Rapoza, J., "Minding Web Site Changes," PC Week, V. 15, No. 37 (p. 32), Sep. 14, 1998.
NetMind Accepts $7 Million Strategic Investment From Three Prominent VC Firms—BancBoston, Softbank and Draper Fisher Jurvetson, PR Newswire, (p. 7632), Nov. 6, 1998.
NetMind Celebrates Five Million Active Users, PR Newswire, (p. 6488), Dec. 18, 1998.
NetMind Updates the World's Largest Free Web Tracking Service, PR Newswire, (p. 5077), Sep. 18, 1998.
Douglis, F. et al., "The AT&T Internet Difference Engine: Tracking and Viewing Changes on the Web," World Wide Web, 1(1), (pp. 27-44), Jan. 1998.
Ajzenszmidt, I.M., "Versatile Intelligent Agents in Commercial Applications," Dec. 13, 1998.
Zhao, Y., "WebEntree: A Web Service Aggregator," IBM Systems Journal, vol. 37, No. 4, 1998.
WebVCR Product Bulletin.
Quick Reference Handout for Wells Fargo On-Line, Jan. 23, 1996, (18 Pages).
Orbix Programmer's Guide, IONA Technologies, Apr. 1995, (10 Pages).
Trader Implementation with Orbix & Allbase (TC talk, Jun. 1994).
Business Wire Article: Wells Fargo Bank is first to offer customers Internet access to bank account balances, May 18, 1995.
Ronayne, M. et al., "Preserving the Past Designing the Future," The Cushing Group, Inc.
"Introduction to Distributed Client/Server Computing With Object Broker," The Cushing Group, Inc.
"Using Corba to Integrate Legacy Systems," Presented by Erik S. Townsend, Object World Boston, Mar. 22, 1995.
"The Business Case for Distributed Computing," Presented by Michael L. Ronayne, Object World Boston, May 1996.
"Lessons Learned Deploying Large-Scale Distributed Object Computing Systems," Presented by Michael L. Ronayne, Object World Boston, May 1996.
Edwards, J. et al., "3-Tier Client/Server at Work," Foreword by Robert Orfali, author of The Essential Client/Server Survival Guide.
Birrell, A. et al., "Implementing Remote Procedure Calls," ACM Transactions on Computer Systems, vol. 2, No. 1, (pp. 39-59), Feb. 1984.
Wells Fargo: A Case Study, The Cushing Group, Inc. (1994-1997).
Ronayne, M. et al., "Distributed Object Technology at Wells Fargo Bank," The Cushing Group, Inc. (1996).
American Banker Article, "Wells Fargo: Innovations in Customer Management," Nov. 3, 1997.
Edwards, N. et al., "Distributed Objects and the World Wide Web," Abstract; Aug. 24, 1994.
"A Note on Distributed Computing," Sun Microsystems Laboratories, Inc., Nov. 1994.
DeNitto, K., "DCE Means Business," Mar. 20, 1995.

"Online Financial Services Participant Guide", Telephone Services University, 1996.

"On-Line Financial Services Project".

Smith, M., Interview with Bruce MacNaughton Article, Nov. 1996.

Truncale, D., CompuServe Brings NT Online Article, Nov. 1996.

CompuServe Keynote Address Given at InternetαTelecom95, Geneva, Switzerland, Oct. 8, 1995.

* cited by examiner

240

SYSTEM AND METHOD FOR AUTOMATED ELECTRONIC NOTIFICATION AND TRANSACTION EXECUTION

CROSS-REFERENCE TO RELATED PATENT APPLICATION

This application claims the benefit, pursuant to 35 U.S.C. § 119(e), of applicants' provisional U.S. Patent Application Ser. No. 60/105,917, filed Oct. 28, 1998, entitled "Apparatus and Method for Automated Aggregation and Delivery of and Transactions Involving Electronic Personal Information or Data" and of applicants' provisional U.S. Patent Application Ser. No. 60/134,395, filed May 17, 1999, entitled "Apparatus and Method for Automated Aggregation and Delivery of and Transactions Involving Electronic Personal Information or Data".

BACKGROUND OF INVENTION

1. Field of Invention

The invention relates to a system and method for automatically notifying an end user of an event and/or performing a transaction related to the event. In particular, the invention relates to notifying an end user of events related to personal information associated with the end user and/or automatically executing transactions involving personal information associated with the end user based on events related to the personal information.

2. Description of Related Art

Looking back over the last five years, it is apparent that as the Internet gained momentum, consumers demanded applications or services that make their online experience simpler, easier to use, and more satisfying. The development of successful Internet Sites has corresponded with a number of themes which have developed over the last few years. When carefully analyzed this evolution is a logical development of the emerging digital economy.

Prior to 1994, the Internet was not a mass media, in part, because the existing technologies (FTP, Archie, Usenet, and Gopher) were not user friendly and required the end user to do all of the work (e.g., the end user had to learn of an existing data source, find the address, navigate to the destination, and download the information). As more consumers began accessing the Internet, Search Engines were created to solve this usability issue. With the advent of the commercial Search Engine, additional content could be easily added to the Internet and the end user had a means of finding and accessing this information. Consumers required better tools than Search Engines for organizing and accessing this wealth of generic content. Push technologies were explored, and eventually, the portal strategy was successfully adopted as an efficient way for consumers to easily access a variety of content sources in a single, easy to use format. As the volume of available online content continues to grow exponentially, portals are now confronted with the need to make different types of content available to different consumers based upon their particular preferences and tastes.

The phenomenal success of Internet portals and destination sites has demonstrated the importance of creatively and intelligently aggregating, organizing and presenting the mass of information available on the Web. Search engines, portals and destination sites have Internet strategies based on the frequency, duration and quality of end user visits to their sites. For this reason, destination sites and portals are constantly seeking content and/or technologies which drive quality traffic to their site and keep it there. Recent trends indicate that Internet users are up to 25 times more likely to come back to a site when this information is organized according to personal preferences.

FIG. 1 displays the current process of acquiring online personal information (PI) 100. The end user first selects an information provider site in step 110. The end user proceeds to step 120 by locating and entering the Internet address of the selected information provider. This step may be accomplished in several manners with varying levels of complexity. A simple means for accomplishing this step is the utilization of a bookmark or favorite whereas locating an information provider for the first time might involve significant time and effort performing online searches. In step 130, the end users logs into the selected information provider's Web site utilizing the site's specific logon protocol. This protocol usually involves verifying the identity of the end user using a user name and password or other means of verification, acquiring the verification data from cookies residing on the end user's system or a combination of requested data and cookie data. The end user continues in step 140 by navigating through Web pages on the information provider's Web site until the desired information is located. During this process, the end user is often required to visit Web pages of little or no use to the end user whose goals is to simply acquire the particular PI residing on the Web site. Ultimately in step 150, the end user is presented with the desired PI. The entire process 100 is repeated for each individual piece of PI desired by the end user. Under this PI access model, the end user must visit each separate information provider, track potentially different identity verification data for each, utilize a different user interface at each site and possibly wade through a significant number of filler Web pages.

FIG. 4 pictorial illustrates the architecture of this current access process. The end user 210 utilizes the client computer 220 to access each PI Web site 250 across the Internet 230. This current model suffers from several significant deficiencies. The end user must login to each site separately. Each separate site has its own graphical user interface. Each site wants the end user to stay and return; each visited site wants to retain end user focus for as long as possible. No true aggregation of PI exists; multiple accesses simply allow sequential access to particular pieces of PI.

One partial solution to these problems has recently evolved in the form of portal sites. Generic portal sites aggregate resources into categories and provide links to sites covering topics within those categories. Yahoo and Excite are examples of generic portal sites. These sites facilitate horizontal aggregation of generic content; horizontal aggregation refers to aggregation of PI access within a particular information provider category such as banks or utility companies. Some portal site allows individual end users a limited capability to select and configure disparate generic PI. Generic PI refers to PI of interest to the particular end user that does not require specific identity verification to obtain. For example, an end user might be interested in the weather forecast for his local area. This information could be integrated into a portal page without requiring identity verification of the particular end user receiving this PI. The individualized portal page provides a significant benefit to users seeking to aggregate generic PI. However, current portal pages do not generally provide PI requiring identity verification such as an end user's stock portfolio or bank balance. Further, these pages do not facilitate transactions utilizing PI.

Under current technology, aggregating PI available over the Internet requires a significant burden in terms of time, effort and learning curve. An end user wishing to access his PI needs to individually visit a variety of information provider sites each with its own requirements, graphical user interface and login protocol.

SUMMARY OF THE INVENTION

In the present invention, electronic actions involving personal information (PI) associated with an end user are automatically performed for the end user. An end user will have a variety of electronic PI associated with him such as stock portfolio, local weather, sports scores, bank account balances or other pertinent information or data. In an embodiment, an end user store contains end user data associated with an end user and records correlating trigger events with responses associated with the end user. A host computer processor accesses the records associated with the end user. For each accessed record, the host computer determines whether the trigger event in the record has occurred, and if so, executes the response correlated to the trigger event determined to occur.

The execution of the response may involve the delivery of a notification of the occurrence of the trigger event to a specified delivery platform such as a wireless device, a facsimile, a telephone, a printing device, a pager, a Web page residing on a Web server, an electronic mail system or other suitable delivery vehicle. Instead of, or in addition, to such a notification, the host computer may automatically execute a transaction involving the personal information associated with the end user.

In a preferred embodiment, the automated execution of such a transaction will involve the host computer accessing records associated with an information provider based on the response indicated in the accessed end user record in which the trigger event was determined to occur. The host computer connects with an information provider computer indicated by the accessed data associated with the information provider. The host computer then executes a transaction script on the connected information provider computer based on the accessed data associated with the information provider, the response indicated in the accessed end user record in which the trigger event was determined to occur and the end user data from the end user store.

The above and other objects and advantages of the present invention will become more readily apparent when reference is made to the following description, taken in conjunction with the accompanying drawings.

DETAILED DESCRIPTION OF THE INVENTION

Figure 1:
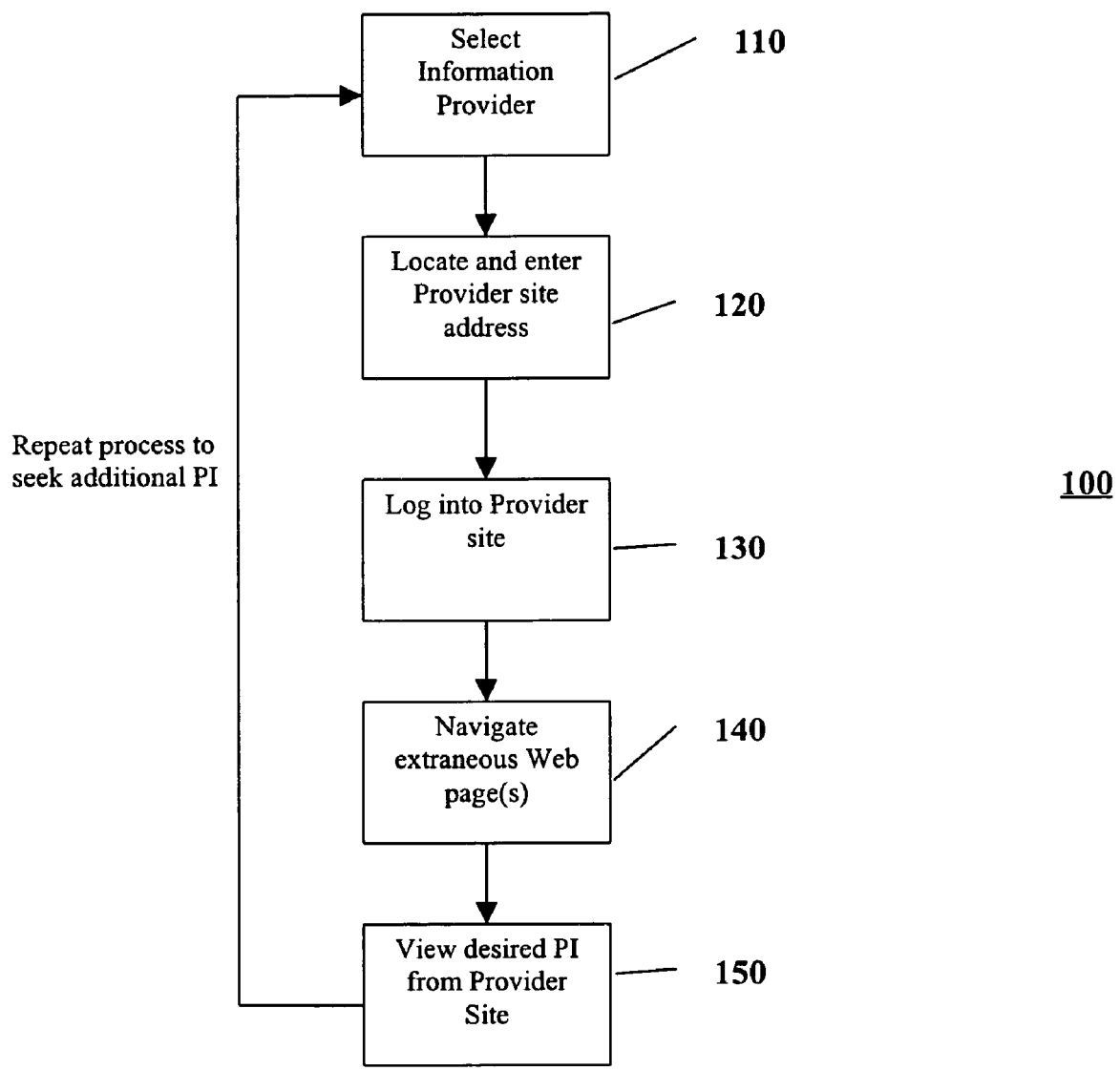
FIG. 1 is a process diagram of the current process that end users perform to access Internet available PI.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

In no time, end users will have to log into a large number of different Web Sites, each with separate passwords, security, rules, software and "look and feel"—just to get the information currently obtained by checking one place—the mailbox at the end of the driveway. The Internet will fundamentally change the way in which end users will access Personal Information (PI) and will make e-commerce as familiar as using an ATM. "Personal Information" is all of the data that companies, information providers, have that is specific or unique to each person such as monthly bills, bank account balances, investments information, health care benefits, email, voice and fax messages, 401(k) holdings or potentially any other information pertinent to a particular end user.

Figure 2:
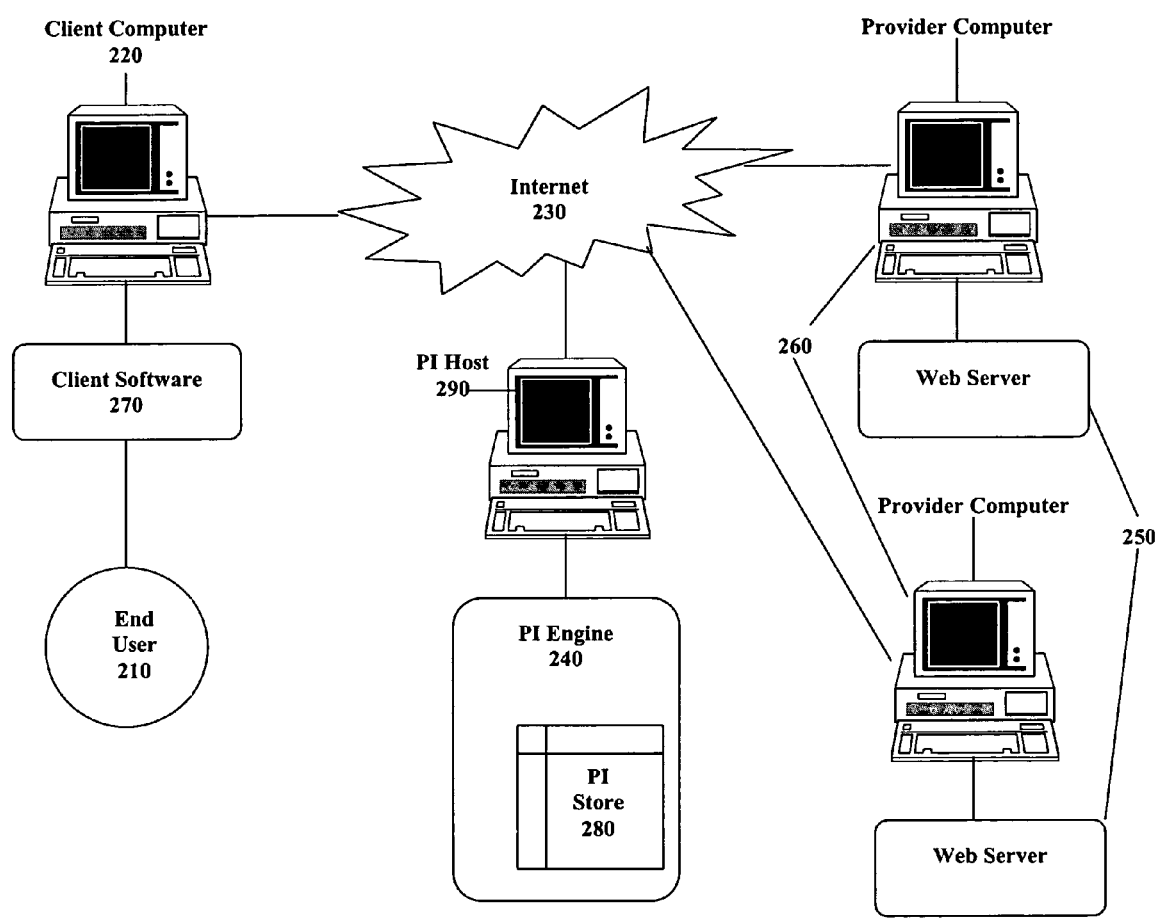
FIG. 2 is a block diagram of the components that could be used to implement present invention.

The present invention alleviates several of the problems with the current PI acquisition methods by automatically aggregating PI, not only generic PI as aggregated by portals but also PI specific to the end user requiring identity verification for access. In one embodiment, the invention automates the PI acquisition and delivery process. FIG. 2 provides a block diagram of components that could be used to implement the present invention. The end user 210 accesses a client computer 220 running client software 270 which in a particular embodiment could be a general Web browser such as Navigator or Communicator (Netscape). The client computer 220 utilizes the Internet 230 to access a PI engine 240 running on a PI host 290. The PI engine 240 examines stored PI 280 for freshness. Any stale PI items are refreshed by directly reacquiring the PI from the particular information provider's Web site 250 running on the provider's computer system 260 accessed across the Internet 230. The PI engine 240 stores the fresh PI in its store 280 and delivers the PI to a selected destination, in this instance across the Internet 230 to the client computer 220 which displays the information to the end user 210 using the client software 270. The PI engine 240 refreshes all stale PI in a like manner prior to forwarding the aggregated PI to both the store 280 and the delivery destination, the client computer 220 in this instance. The PI engine 240 may refresh the PI sequentially or in parallel. For example, the end user's checking account balance would be updated through his bank's Web site, his email from his particular email site, his portfolio information from his broker's site and his electricity bill from his electricity company's site.

Figure 3:
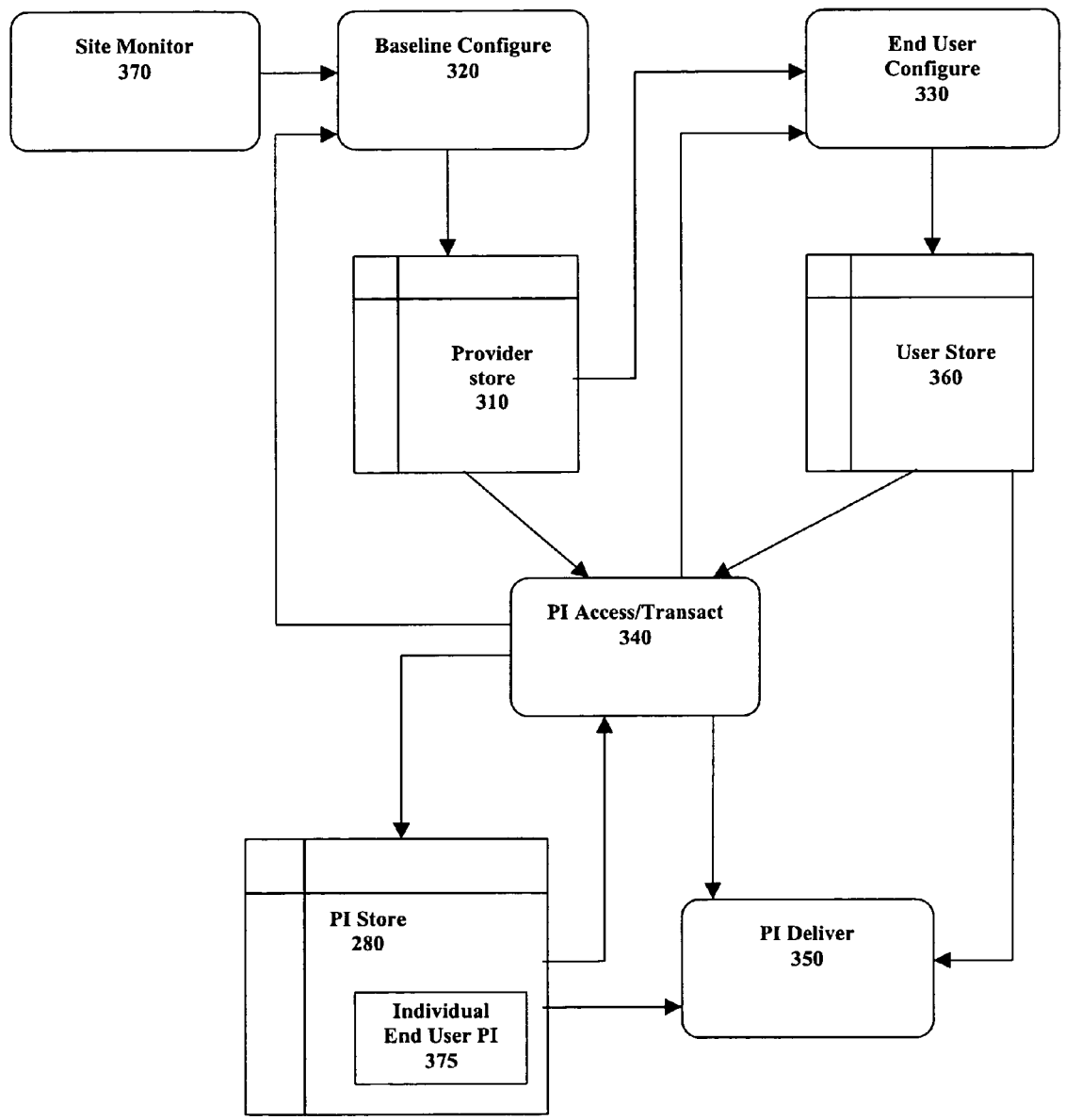
FIG. 3 is a block diagram of the components of the PI engine.
Figure 4:
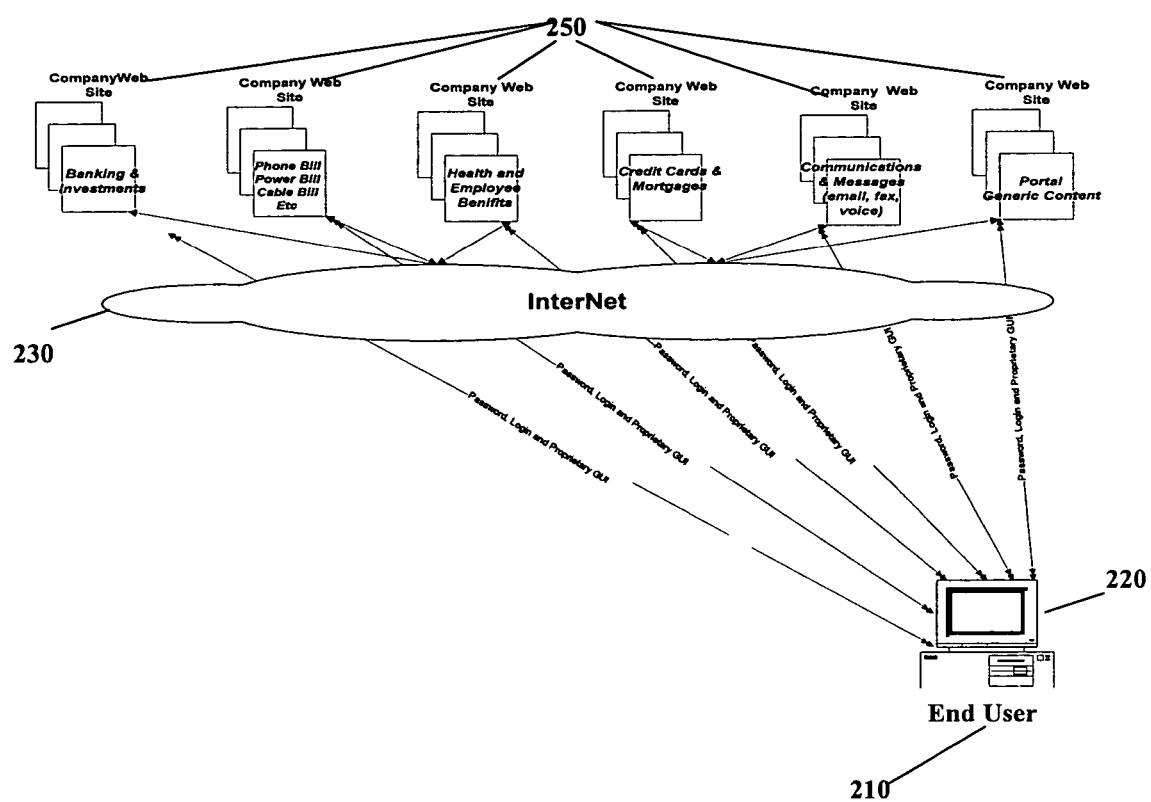
FIG. 4 is a diagram of the current PI access architecture.

FIG. 3 displays a block diagram of the components of the PI engine 240. The PI engine 240 is composed of both storage and processing components. The three primary storage components are the PI store 280, the PI Provider store 310 and the user store 360. The first storage component of the PI engine 240 is the PI store 280. The PI store 280 contains each individual's PI record 375; the PI associated with a particular end user is segregated from the PI of all other end users. The PI engine also utilizes a provider store 310 that maintains general parameters associated with particular PI providers. The general parameters of a PI provider define the types of verification data necessary and the procedures to be followed to gain access to the particular PI provider. Each PI provider record also contains the types of PI provided by the PI provider and the types of transactions supported by the provider. Along with the type of PI or transaction, the record also contains the additional types of data and procedures necessary to access the PI or execute the transaction. A user store 360 is also necessary to maintain configuration and verification information concerning particular end users. For each end user, the user selected PI providers, PI and transactions are registered along with the verification data necessary to acquire the PI or execute the transaction from the PI provider.

The PI store 280 may be implemented in a variety of ways. Referring to FIG. 2, the PI store 280 may comprise a database residing on the PI Host 290. Under this approach, the PI for each individual end user 210 is stored as a separate record or object 375 in the database. In yet another embodiment, the PI for each end user 210 could be stored in a separate file 375, thus performing the task of segregating PI of different users at the file level.

In addition, or as an alternative, the PI associated with each end user 210 may reside on his/her client computer 220 using cookie technology as specified in D. Kristol and L. Montulli, "HTTP State Management Mechanism", Request For Comments (RFC) 2109, February, 1997 (available at http://www.ietf.org/rfc/rfc2109.txt), which is expressly incorporated herein in its entirety. The PI associated with the end user 210 would be stored as PI cookies 375. This implementation mechanism provides inherent support for segregating PI associated with one end user 375 from PI associated with all other end users. Utilizing this method as a substitute for a centralized store provides a layer of security against unauthorized access. As a further measure, PI data stored in cookies could be stored in an encrypted format.

Figure 6:
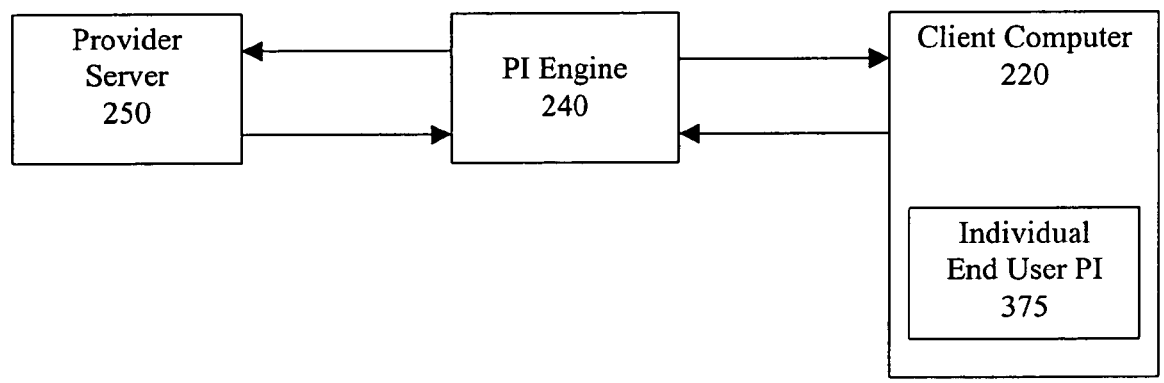
FIG. 6 is a diagram of the cookie/client cache architecture.

FIG. 6 provides a diagram of a typical implementation of the PI store 280 using cookie technology; references in the foregoing description are also made to FIG. 3 with respect to the internal workings of the PI engine 240. When an attempt is made to access PI by an end user 210 directly, or through an intermediary Web server, the PI access/transact component 340 of the PI engine 240 would retrieve stored PI 375 from the PI store 280. Under this approach, this stored PI 375 would be received directly from cookies sent by the client computer 220 of the end user 210. The PI access/transact component 340 would perform any decryption if necessary. Any updates required would be obtained by direct access of PI providers 250. The PI deliver component 350 would provide the mechanism for both updating the PI store 280 as well as transmitting the requested PI to the end user 210, directly or through an intermediary Web site. The PI deliver component 350 would place the updated PI in the PI store 280 by replacing the outdated PI cookies 375 stored on the client computer 220. The PI deliver component 350 would also handle any encryption if necessary. The PI deliver component 350 would also be responsible for transmitting requested PI. In a preferred embodiment, the PI store 280 would be implemented using this cookie-based architecture.

The user store 360 may be implemented in a variety of ways. Referring to FIG. 2, the user store 360 may comprise a database residing on the PI Host 290. Under this approach, the personal configuration data for each individual end user 210 is stored as a separate record or object in the database. In addition, or as an alternative, the end user data could be distributed in a manner similar to the cookie/cache architecture describe above with respect to the PI store 280.

In a preferred embodiment, the user store 360 could be implemented through personal information configuration (PIC) files. PIC files store a personal profile such as name, address, and social security number in secure, encrypted fashion for each end user. PIC files facilitate automatic registration of end users with information Providers via the end user configuration component 330. This component will read the PIC file and, using retrieved personal information, pre-populate registration templates for selected Providers. Then, it will prompt the user to enter required information that is missing from profile, if necessary. If the information is complete, the registration is automatically completed. Next, the end user configure component 330 completes any Provider registration forms, gets responses and updates the end user's PIC.

The four primary processing components access and manipulate the data in the three stores. The processing components may execute on a single processor, such as a file server computer system based on a Pentium class (MMX, PRO, II, III, etc.) central processing unit or an equivalent, or multiple processors. These four processing components are the Baseline configure component 320, the end user configure component 330, the PI access/transact component 340 and the PI delivery component 350 as seen in FIG. 3. The Baseline configure component 320 provides the interface by which new user selectable PI providers are added to the system. This component 320 might be implemented in a variety of ways including trial and error followed by manual entry of configuration information, semi-automated trial and error (automated location of Hypertext Markup Language (HTML) <FORM> elements, Javascript functions and Java applets) followed by manual entry of configuration information or, preferably, configuration by example (executing the protocol in a simulated Web client where the simulated Web client automatically generates a list of required data and a list of steps in the access process). These processes would be utilized at two levels: the first level being the set of data and steps required for general access to the particular PI provider and the second level being the set of additional data and steps required for accessing each particular piece of PI on the PI provider's site. The baseline configuration component 320 may be triggered independently when a new PI provider is added to the system, or it might be triggered as a result of a failure of the PI access/transact component 340 potentially indicating a change in access requirements for the failed access. This latter warning would more likely result where the PI access/transact component 340 has made a comparison between requirements supplied by the Provider store 310, both general to the PI provider and specific to the PI or transaction, and the end user data supplied by the user store 360 after seeking end user verification via a request of the end user to confirm the previously entered required access data via the end user configure component 330 and found an inconsistency. When an inconsistency is determined, updates to the Provider store 310 are made to bring the Provider data into conformance with current access/transaction requirements.

The end user configure component 330 allows an end user to select and configure PI and transactions of interest to the specific user. This configuration information is maintained in the user store 360. When an end user initially subscribes to the system according to the present invention, the system allows the user to select the types and sources of PI and/or transactions desired. First, the system requests permission from the end user to act on his behalf to obtain any selected PI and to execute any authorized transactions. Next, the system provides the user with a list of known information suppliers and the types of PI supplied from and transactions supported by the particular PI provider from the Provider store 310. The system requests the verification data necessary for accessing each selected PI provider and the additional data required by the particular PIs and/or transactions desired from that PI provider. Assuming the end user is already a registered user with the selected PI provider or the particular PI provider does not require prior registration, the data supplied by the end user is placed in the user store 360.

One method of obtaining any cookie data would be for the end user to access each previously accessed PI utilizing the PI engine 240 as a proxy server. The PI engine 240 would pass the cookie data to the PI provider site with the appropriate Web page requests to obtain the PI or execute the transaction and with the end user's permission retain a copy of the cookie data in the end user's record in the user store 360. An alternate means of obtaining the cookie data would be a direct upload of the cookie information from the end user's computer. In a preferred embodiment, no cookie data is necessary where a user is already registered with a provider. All that is necessary is the verification data for login.

If the end user does not have the requisite information because he is not a registered user of a selected PI provider, the user configure component 330 prompts the user for the information necessary to register the end user with the PI provider and performs the registration procedure required by the PI provider. A simulated Web client could perform this process automatically supplying the access data as required and sending any necessary cookie data. The manner in which such a simulated client registers the end user depends significantly upon the interaction method used on the PI provider Web site. If the Web site uses HTML forms and common gateway interface (CGI) applications, the end user configure component 330 can formulate a uniform resource locator (URL) to replicate the effect of actual form usage and submit this URL to the simulated Web client. The use of a URL to mimic an HTML form is equivalent to manually entering the data into the Web <FORM> element. See Kerven, Foust, Zakour, HTML 3.2 Plus How-To, Waite Group Press, 1997, pp. 559-569. If the Web site uses a mixture of HTML forms and Javascript functions, a simulated Web client with a modified Javascript interpreter could effectively register the user by following the end user registration process for the particular PI provider. The registration process to follow would be obtained from the record of the particular PI provider in the Provider store 310. The Javascript interpreter in the simulated Web client would follow this procedure and supply the data supplied by the end user. A similar process could be used if the registration process on the PI provider Web site utilizes a Java applet. A Web client with a modified Java bytecode interpreter could effectively register the user by following the end user registration process stored for the particular PI provider in the Provider store 310. The bytecode interpreter would supply the data previously entered by the end user rather than requiring interactive input from the end user. If the PI provider Web site utilizes a combination of forms, scripts and applets, the individual procedures above could be used in combination to accomplish the desired registration.

With reference to FIG. 2 and FIG. 3, a modification of the Java virtual machine (VM) could allow for automated interaction between the various functional components of the PI Engine 240 and Java applet available through provider Web servers 250. Templates for interacting with particular applets could reside in the Provider store 310. The specific input data utilized by such templates could be stored in the User store 360. When a functional component such as the end user configure 330 or the access/transact 340 components requires automated communication with a Java applet on a provider Web server 250, the modified Java VM would facilitate this interaction.

Figure 10:
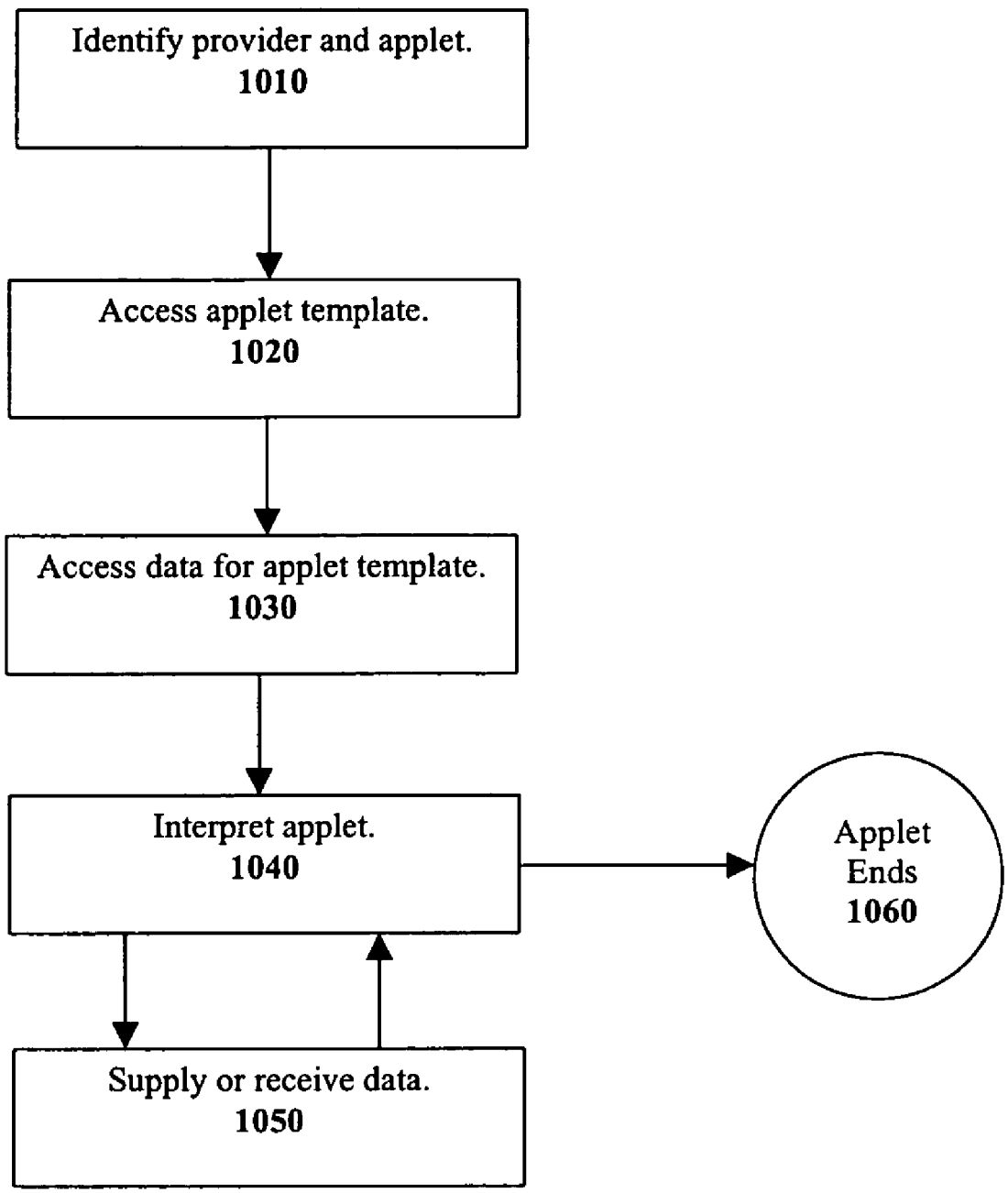
FIG. 10 illustrates a process for automated applet interaction utilizing a modified Java virtual machine.

FIG. 10 illustrates one process utilizing such a modified Java VM to achieve such automated interaction. The functional component requiring interaction identifies the provider and the particular applet on that provider with which the component needs to interact in step 1010. In step 1020, the component accesses the necessary template for interacting with the applet from the Provider store 310. Proceeding to step 1030, the component accesses the User store 360 to obtain the data required by the template. The modified Java VM interprets the applet in step 1040 and, rather than requiring interactive input from a user as in a normal Java applet execution, awaits input from or output to the interacting functional component of the PI engine. In step 1050, the functional component supplies input data to the modified Java VM according to the accessed template and retrieved data and receives output data according to the accessed template. Steps 1040 and 1050 repeat so long as additional input to or output from the applet continues. Upon termination of the applet, the functional component continues with its own processing in step 1060.

A successful registration could result in displaying the registration information to the end user for future reference. Further, the end user configure component 330 stores the requisite access verification data for the PI provider and the additional data required to access the selected PI or transaction in the user store 360.

In a preferred embodiment of such automated registration, any necessary cookie data would be accepted and stored as needed by the end user configure component 330. In many cases, cookie data is session specific and, therefore, of little long term utility. Cookies generated during the registration process are used solely during the registration process then discarded once registration is complete.

A failed registration could result from several situations. First, the end user attempting to register with the PI provider does not qualify for registration; for example, an end user attempting to register with a bank with whom the end user does not maintain an account and where the bank only allows access to account holders. Next, the end user may have supplied improper or incorrect information. For example, a bank registration process might require a social security number, a password, a bank account number and the maiden name of the end user's mother; if the user entered an incorrect social security number, the registration process would fail. Finally, the PI provider may have altered the registration procedure for its Web site. In this situation, following the process supplied from the Provider store 310 would yield a failed registration. In the instance of any registration failure, the end user could be presented with the data initially supplied to the system for registration. The system could then ask the end user to double check the correctness of the information provided and to correct and resubmit the data if an error is found. A second failure resulting from the submission of identical requisite data might generate an error message presented to the end user stating that either the end user is ineligible to access the selected PI from the selected PI provider or that alteration by the PI provider may have caused an error in registration. This second failure could also trigger a warning suggesting the need to potentially reconfigure the record for the PI provider in the Provider store 310.

Ultimately, the user store 360 would contain a record for each end user. This record as previous described could be a database entry, one or more cookies or a file such as a PIC file. Each record would identify the selected PI providers along with the general access verification data needed and also under each PI provider would be a list of PI supplied and transactions supported by the particular PI provider of interest to the end user along with the additional data, if any, necessary to access that PI or execute that transaction. Specifically, duplicative information such as an end user's name would be centrally stored in the record once.

The end user configure component 330 also allows the end user to select one or more delivery destinations. One destination might be the end user's computer as exemplified by the client computer 220 running client software 270 in FIG. 2; however, a computer is not the only destination contemplated by the present invention. The destination for PI delivery could include facsimile, electronic mail, telephone, conventional mail, pager, other wireless device such as a Palm Pilot (3 Com), Web page or channel, Web browser or other delivery mechanism. The present invention also contemplates indirect access of PI by the end user utilizing a Web site as an intermediary; however, such indirect access would not require the end user to specify a delivery destination unless additional delivery options were desired.

Further, access to the end user configure component 330 may occur through direct access to the PI engine via the Internet as contemplated by the client computer 220 running client software 270 in FIG. 2; however, alternative methods of access are equally feasible. For example, the user might indirectly access the PI engine through the use of an intermediary Web site. A telephone interface to allow access to the end user configure component is another alternative.

With reference to FIG. 3, the PI access/transact component 340 supports the update, acquisition and transaction functionality of the PI engine 240. The PI access/transact component 340 is responsible for accessing and storing user PI and executing transactions authorized by the end user. When access or update is needed for a selected end user, the PI access/transact component 340 combines information from the Provider store 310 and the user store 360 to update end user PI in the PI store 280. For each piece of PI requiring access or update, the PI access/transact component 340 looks up the access procedure and information needed for the particular PI in the Provider store 310. The verification and access data is found in the user store 360. The PI access/transact component 340 utilizes this information to connect to the PI provider's Web site across the Internet and to access the PI. Where multiple pieces of PI require updating or access, the accesses may occur in series or parallel.

Requested transactions would be similarly supported. For each transaction, the PI access/transact component 340 combines information from the Provider store 310 and the user store 360 to perform the requested transaction. The PI access/transact component 340 looks up the transaction procedure and information needed for the particular transaction in the Provider store 310. The verification and access data is found in the user store 360. The PI access/transact component 340 utilizes this information to perform the transaction across the Internet from the PI provider's Web site.

A simulated Web client could perform access or transaction processes automatically supplying access and verification data as necessary. The manner in which such a simulated client access PI or execute transactions depends significantly upon the interaction method used on the PI provider Web site. If the Web site uses HTML forms and common gateway interface (CGI) applications, the PI access/transact component 340 can formulate a uniform resource locator (URL) to replicate the effect of actual form usage and submit this URL to the simulated Web client. The use of a URL to mimic an HTML form is equivalent to manually entering the data into the Web <FORM> element. See Kerven, Foust, Zakour, HTML 3.2 Plus How-To, Waite Group Press, 1997, pp. 559-569. If the Web site uses a mixture of HTML forms and Javascript functions, a simulated Web client with a modified Javascript interpreter could effectively access the PI or perform the transaction by following the PI access/transact process for the particular PI or transaction respectively. The access or transaction process to follow would be obtained from the record of the particular PI or transaction in the Provider store 310. The Javascript interpreter in the simulated Web client would follow this procedure and supply the data found in the user store 360. A similar process could be used if the PI provider Web site utilizes a Java applet. A Web client with a modified Java bytecode interpreter could effectively access PI or perform transactions by following process stored for the particular PI or transaction in the Provider store 310. The bytecode interpreter would supply the data from the user store 360 rather than requiring interactive input from the end user. If the PI provider Web site utilizes a combination of forms, scripts and applets, the individual procedures above could be used in combination to accomplish the desired access.

In a preferred embodiment of such automated accesses or transactions, any necessary cookie data would be accepted and stored as needed by the PI access/transact component 340. In many cases, cookie data is session specific and, therefore, of little long term utility. Cookies generated are used solely during these functions then discarded once the mining or transaction operation is complete.

In order to provide personal information to an end-user quickly after login, it is necessary for the PI access/transact component 340 to select an end user for data harvesting prior to the login of the end user. One approach to this solution is to update all of an end user's PI whenever the end user, directly or through an intermediary Web site, requests access to his/her PI. Another approach would be to update all of an end user's PI supplied by a particular provider whenever PI from that supplier is requested. Thus, the act of logging into the system by an end user effectively selects that end user for immediate PI update. However, this approach may result in the inefficient use of the PI Engine 240 resources.

Given the large number of potential users and providers, and the goal of providing the freshest data possible, another embodiment includes an algorithm developed to optimize the schedule in which end users are selected for data harvesting from a provider. This algorithm factors in the provider's update policy, the user's login habits, and the user-provider account characteristics. The proper application of the algorithm should ensure that PI is harvested as infrequently as possible for a given user, thus minimizing system resource consumption.

If the next provider update time and the next expected user login can be accurately predicted, a model can be created that will allow for smarter harvesting. Rather than harvesting data for all users of a provider at once when the provider updates its site, the harvesting can be spread out over time based on expected login times of users and network activity profiles. For example, if Provider A updates its site on Friday night and a large number of users of that provider are not expected to login again until Monday morning, the harvesting load can be distributed across multiple days. This has the advantage of minimizing both the peak loading of the PI Engine 240 as well as consumption of the provider's bandwidth by the PI Engine 240. To gain this optimization, the PI Engine 240 must maintain and refine models of each provider and user. Such data can be maintained in the provider store 310 and the user store 360 respectively.

Each time a user utilizes the PI Engine 240, the time and date may be captured. Once a sufficient number of login times are accumulated, they may be analyzed with respect to day of month, day of week, and time of day. These are used in a model to predict the next expected user login. The model is then tested and refined with subsequent logins until a measurable degree of confidence is established. Once high confidence is determined, the user model is incorporated into the adaptive harvesting scheduler. Until a high confidence level is reached for a particular end user one of the aforementioned harvesting approaches may be used.

Each provider updates its site based on policy driven by their unique resources and business model. For any adaptive scheduler to work, the policy for each provider must be modeled. In some cases, the policy is self-evident. In others, it must be determined empirically. A provider's policy will most likely fall into one of the following categories:

Type I. Updated periodically for all users
Type II. Updated periodically relative to each user
Type III. Updated in a pseudo-random manner The following three approaches may be used based upon provider type.

Type I Provider Policy Scheduling Algorithm

1. Assume users with a "no confidence" model have an immediate login time.

2. Order the users chronologically based on their predicted login time.

3. Shift the expected login time for all users back one hour.

4. Perform a density curve fit along temporal boundaries to get a polynomial function that can be used to determine the number of user accounts to harvest for a given epoch.

5. Perform an integral matching algorithm with the inverse of the network activity curve for the time period in question to adjust the distribution curve.

6. If possible, re-distribute peak harvesting time toward time zero to flatten the distribution curve.

7. Assign harvesting times to the sorted users according to the distribution curve.

8. Monitor time and harvest the user account when appropriate.

Type II Provider Policy Scheduling Algorithm

For each provider that falls into this category, an attribute of the user must be identified that determines when the personal information is updated. In some cases, the user may need to be queried for the information. In others, it can be determined from the harvested information. If the attribute cannot be established for a user via either of these means, the provider site may be monitored daily for changes in personal information until a pattern is established.

Since there is a natural, even distribution of accounts updated by a provider for a given day, a user's account can be harvested an hour before his expected login time. As in the Type I algorithm, users with a "no confidence" model should be immediately harvested.

Type III Provider Policy Scheduling Algorithm

This type of policy is the most difficult of all. Since the provider updates a user's account in a non-deterministic manner, a decision must be made for each provider as to the criticality of the information relative to the user. For those highly critical providers, each user account should be harvested daily, perhaps even more frequently. For those less critical providers, user accounts should be harvested less frequently and possible when overall system activity is low.

The PI deliver component 350 is responsible for formatting and delivering the PI to the end user. Usually delivery will only occur subsequent to updating all stale PI. The PI will be delivered to one or more destinations (e.g. facsimile, telephone, pager, Web browser, e-mail, etc.) as specified in the user store 360 except where the PI is accessed via an intermediary Web site. Where the destination is not an intermediary Web site, the PI deliver component 350 performs all formatting necessary to deliver the PI to the appropriate destinations. For example, where the destination is a Web browser, the PI would be formatted as an HTML document, or where the destination is a telephone, the PI would be submitted for voice synthesis and transmission.

Figure 5:
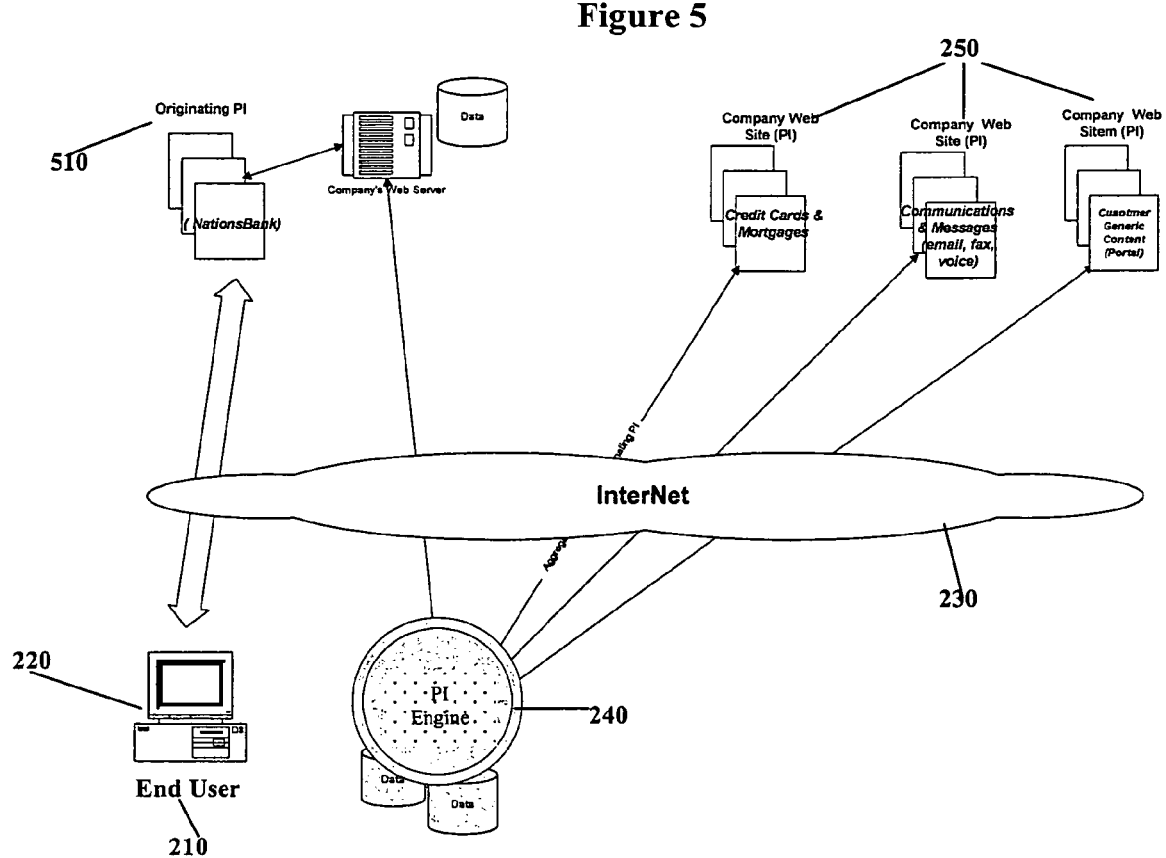
FIG. 5 is a diagram of an architecture supporting PI access utilizing an intermediary Web site.

In the case of an intermediary Web site, the PI is delivered in a format configurable by the intermediary Web site. FIG. 5 pictorial illustrates a possible embodiment of the current invention utilizing an intermediary Web site. An end user 210 utilizes a client computer 220 to access an intermediary Web site 510 across the Internet 230. The end user 210 logs into the intermediary Web site 510. The intermediary Web site 510 contacts the PI engine 240 across the Internet 230 and directly receives the end user's PI updated as required from the PI provider Web sites 250. The intermediary Web site 510 receives the PI, incorporates it into pages according to its particular formatting style and graphical user interface and delivers these pages to the end user 210. The use of the PI engine 240 is transparent to the end user 210. Further, an intermediary Web site 510 serving aggregate PI to an end user 210 may, and most likely will, simultaneously serve as a PI provider.

In another embodiment, this formatting occurs via a dynamic HTML generation system combining stylistic and layout information from a variety of sources. The PI deliver component 350 generates custom HTML pages dynamically. These pages are customized based on a number of stylistic factors (such as background color, foreground color, font size, color and style, page layout, etc) from a variety of sources and content from a variety of sources. Information providers, distributors, the end user, the PI deliver component 350 or any combination of these sources, or other relevant sources, may provide customization factors used in the page generation. Finally, each HTML page must be filled in with data. The data used in such pages may originate from such sources as information providers, distributors, the end user, the PI deliver component 350 or any combination of these sources, or other relevant sources. The required solution is a system representing a generic algorithm for performing such HTML generation at run-time. The style and content may be provided in any suitable format such as the Extensible Stylesheet Language (XSL), as specified by W3C in http://www.w3.org/TR/WD-xsl/, which is expressly incorporated herein by reference in its entirety, and/or the Extensible Markup Language (XML) as specified by W3C in http://www.w3.org/TR/REC-xml, which is expressly incorporated herein by reference in its entirety, or other suitable formatting standard. The key requirements for such a system are complete encapsulation of the problem domain and run-time efficiency.

Figure 8:
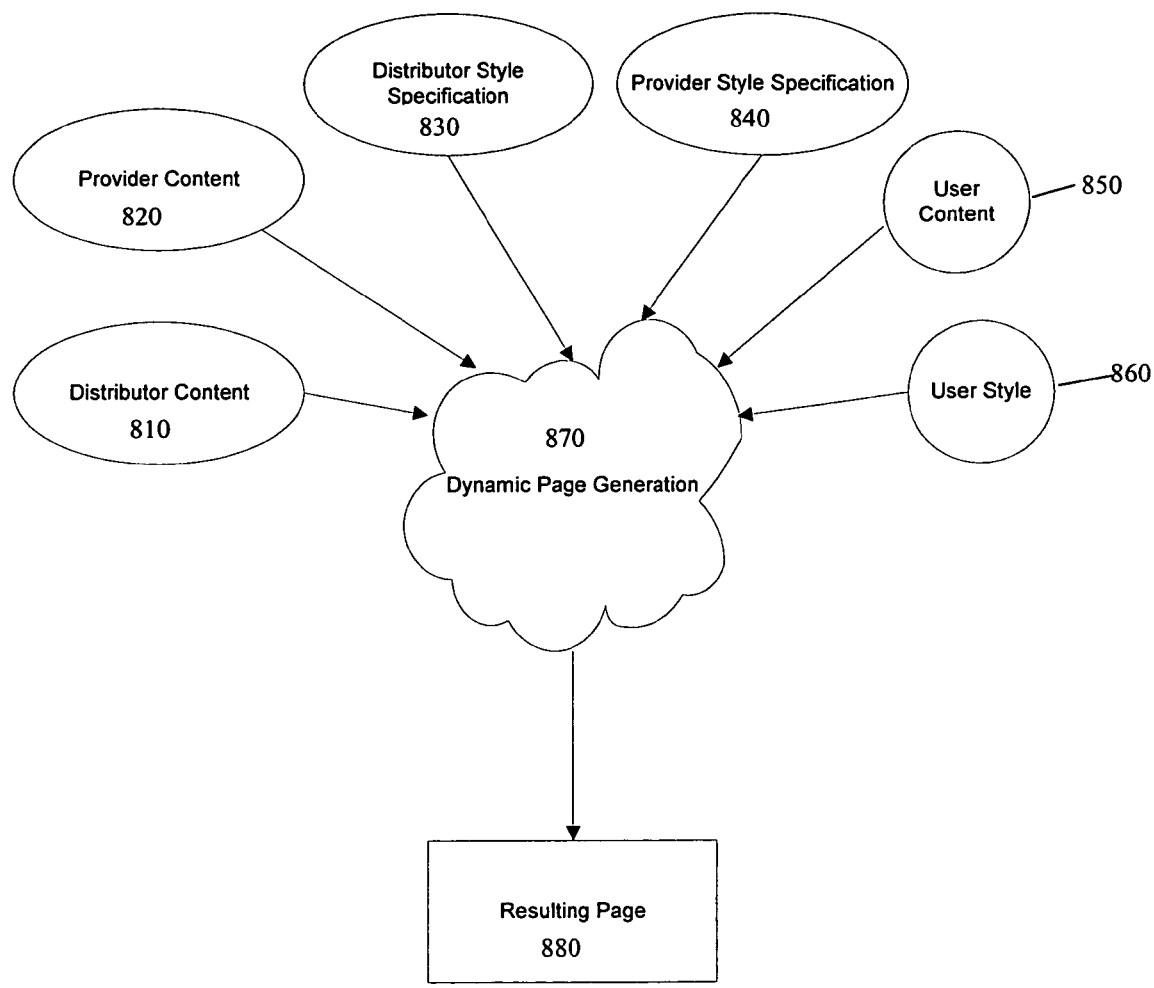
FIG. 8 depicts the integration model for the dynamic generation of HTML pages.

In preferred embodiments, the solution is based on the following basic model as depicted in FIG. 8:

1. Six sets of customization factors are identified: distributor content 810, provider content 820, distributor style specification 830, provider style specification 840, user-specific content 850 and user-specific style 860.

2. Each set of customization factors 810-860 is considered a separate, independent and required input to the run-time system 870 that performs dynamic page generation.
3. Each input 810-860 will be in form of an XML stream.
4. Output 880 will be in form of an HTML stream.
5. The dynamic page generation system 870 will produce valid output 880 for each set of six valid inputs 810-860.

Figure 9:
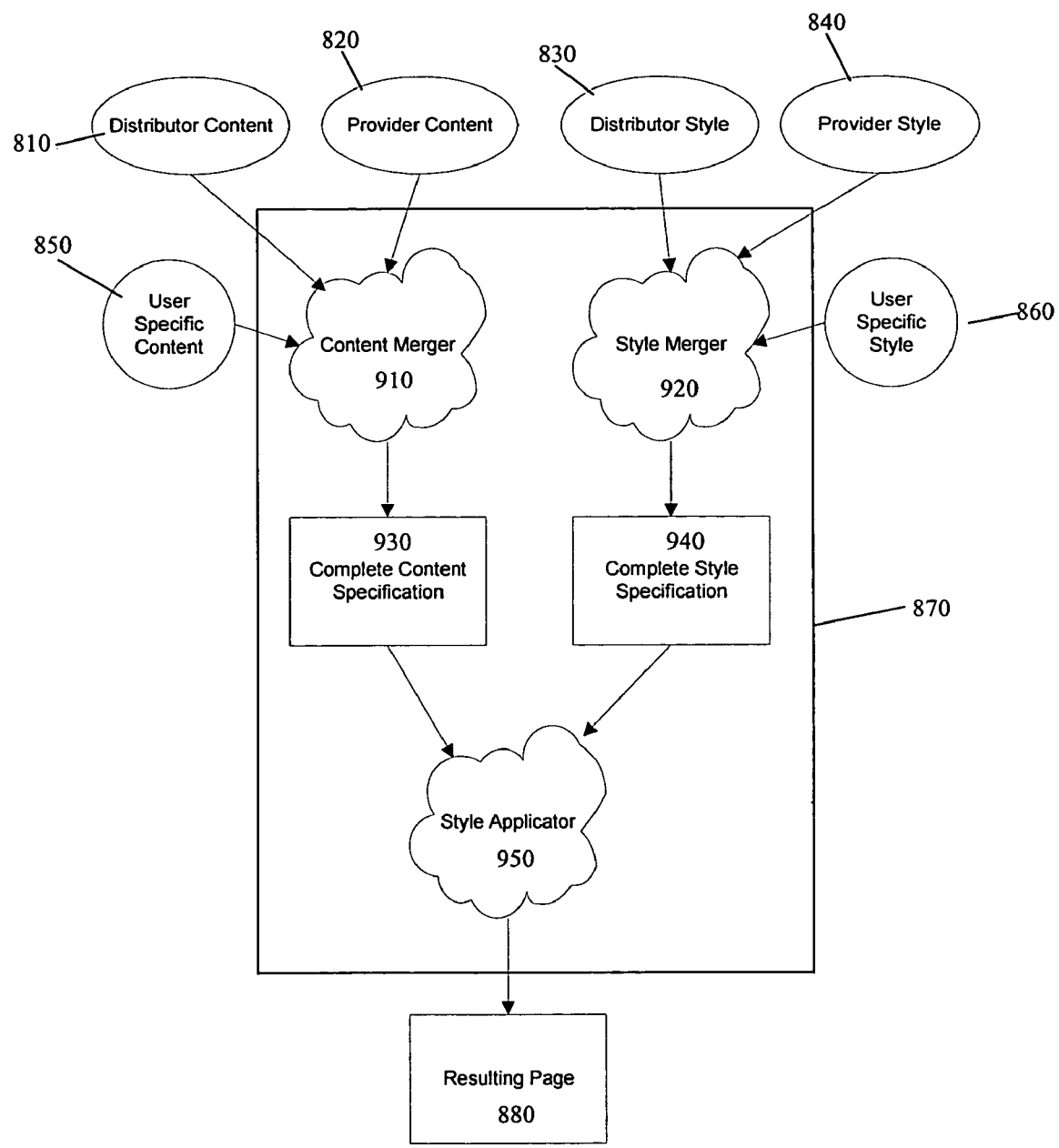
FIG. 9 displays the run-time process for dynamic generation of HTML page.

FIG. 9 illustrates an actual run-time sequence of input processing by such a system 870:
1. Distributor content 810 is combined with provider content 820 and with user-specific content 850 to produce a complete content specification 930 by the content merger unit 910.
2. Distributor style 830 is combined with provider style 840 and with user-specific style 860 to produce a complete style specification 940 by the style merger unit 920.
3. The style specification 940 is applied by the style applicator 950 to content specification 930 in order to produce the resulting page 880.

In order to completely encapsulate the problem domain, the following requirements must be placed on the system 870:
1. Each XML input 810-860 is a valid XML stream.
2. All content specifications 810, 820 and 850 are valid with respect to the same Document Type Definition.
3. All style specifications 830, 840 and 860 are valid with respect to the same Document Type Definition (such as the XSL DTD standard).
4. The merging units 910 and 920 whose task is to take two or more XML streams and produce a combined XML output must be able to produce such output for any set of valid XML inputs.

Another method of performing this task would be to format PI as HTML elements with predefined CLASS attributes. The intermediary Web site receiving these elements could dynamically include them in page forwarded to the end user of the PI. The pages incorporating such elements could include different style information associated with the predefined CLASS set. Level 1 cascading style sheet convention could be used to implement such configurability. See Kerven, Foust, Zakour, *HTML 3.2 Plus How-To*, Waite Group Press, 1997, pp. 651-693; Walsh, "An Introduction to Cascading Style Sheets," *World Wide Web Journal*, Winter 1997, pp. 147-156. This option requires minimal programmatic support by the intermediary Web site but restricts to some degree the intermediary Web sites flexibility in presenting the PI to the end user.

Alternatively, an intermediary Web site could develop an application utilizing a standardized application programming interface (API) to directly access the PI data. In this instance, the PI deliver component 350 could either be bypassed or potentially used as the component responsible for servicing API requests for data. Under this model, the intermediary Web site would be responsible for all formatting decisions with respect to the raw PI data. This implementation option requires additional programmatic support by the intermediary Web site but allows for greater flexibility in the use of the raw PI.

The ability to utilize an intermediate Web site to deliver PI is of significant utility. This capability allows an end user already familiar with an existing PI provider to access not only the PI associated with the particular PI provider but also all PI from other PI providers in the comfort of a familiar user interface, namely the existing PI provider Web site. In this situation, the request for PI would directly originate with the intermediary PI provider Web site and indirectly from the end user. Security measures would restrict access to authorized intermediate Web site access. These measure might include verification of the end user and the intermediate Web site. Further, verification of the association between the end user and the particular intermediate Web site might also be required for additional security.

In addition, the use of an intermediary Web site also supports a novel transaction model. In this transaction model, the intermediary site subsidizes, or fully compensates, the PI engine administrator for services provided to the end user. These transactions are facilitated via the auditing and tracking capabilities of the PI engine. These capabilities allow the calculation of per user fees, per transaction fees, per access fees or some combination thereof to be assessed. The assessed values could be directly charged to the intermediary Web site. Alternatively, such values could be debited from a minimum monthly fee charged to the intermediary Web site with any fees beyond the minimum charged directly to the intermediary Web site.

Figure 11:
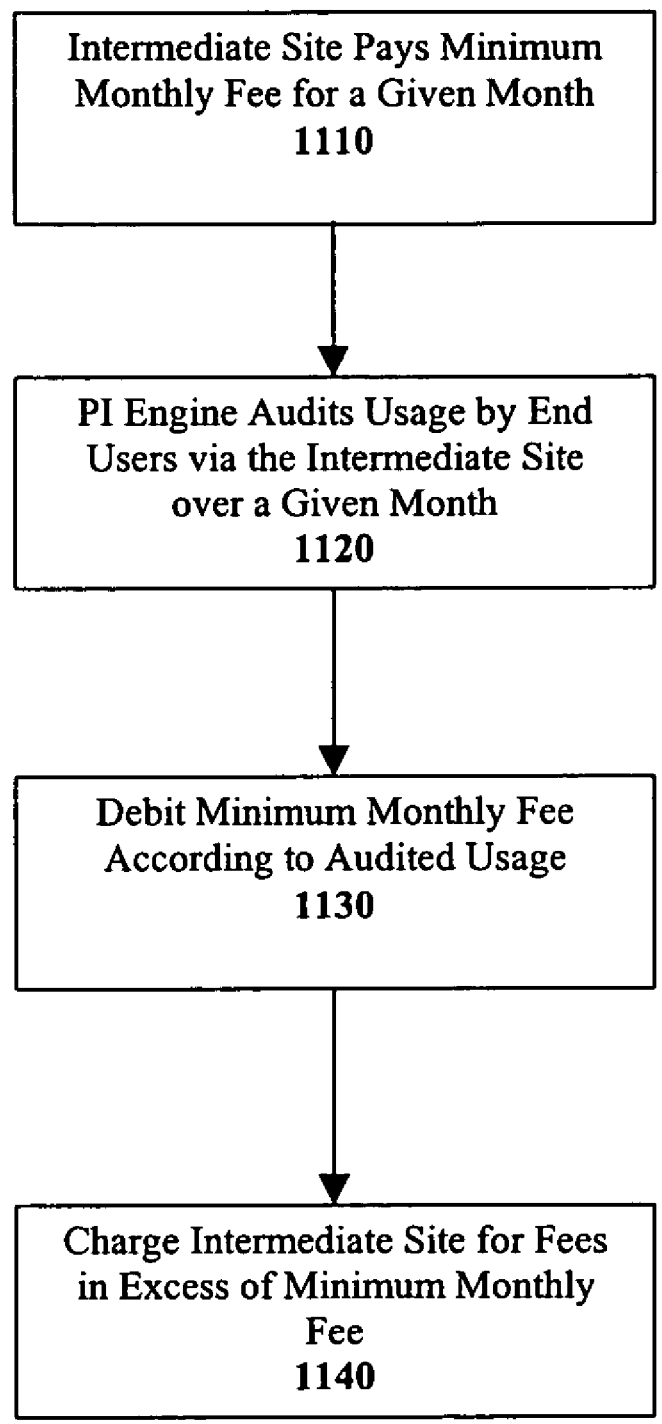
FIG. 11 is a flowchart exemplifying an intermediary Web site transaction structure.

FIG. 11 depicts a flowchart of a typical process according to the described model. The intermediary Web site pays a minimum monthly fee in step 1110. In step 1120, the PI engine audits and tracks end user usage via the intermediary Web site. The audited usage is used to assess a fee on a per user, per access, per transaction or combination basis. In step 1130, this audited amount is debited from the fee paid in step 1110. In step 1140, the intermediary Web site is charged for any fees in excess of the minimum fee paid.

Often an end user may require access to the underlying Web page generated by the provider of a particular piece of PI. The delivery component may deliver not only the PI but also an access point directly to the provider's page supplying that PI. The access point may take the form of a link, a form button or some other interactive access mechanism.

Figure 7:
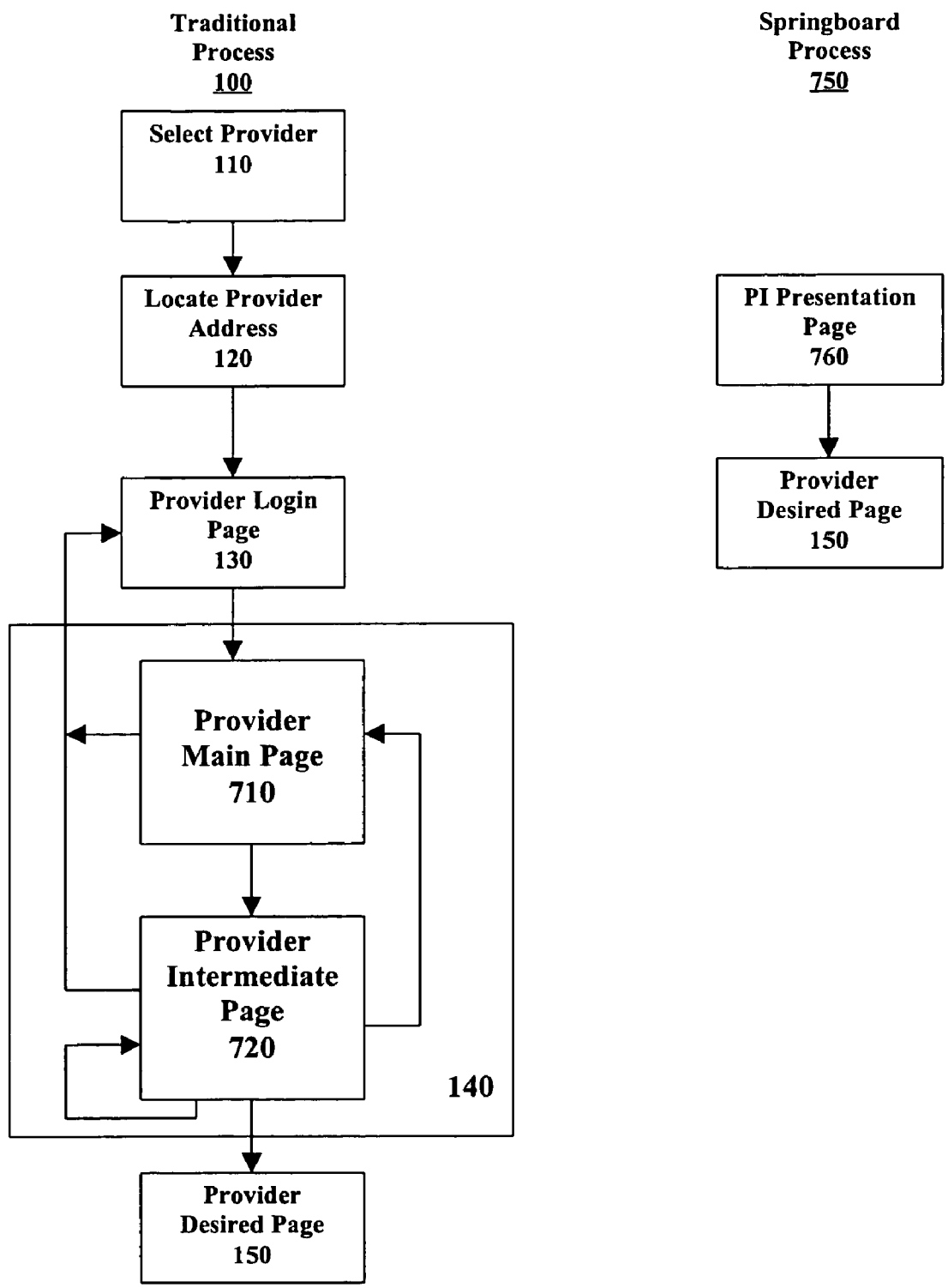
FIG. 7 is a flowchart for accessing pages underlying particular PI via the traditional process of FIG. 1 and via springboard technology.

Such an access point significantly improves the efficiency of accessing the underlying page by the end user as exhibited by FIG. 7. In the traditional process 100 for accessing PI, the end user must proceed through numerous intermediary pages requiring a variety of often tedious interactions before reaching the desired page.

The end user must first identify the Provider 110. Next, the end user must locate the Provider's Web address 120. Then, the user requests the Provider's login page 130. If the end user does not remember the requisite information, this information must be found, or the desired information will remain inaccessible via the Web. The end user then navigates the Provider's Web site 140. This often entails visiting the Provider's main page 710 followed by viewing a variety of intermediate pages on the Provider's site 720. The end user may have to backtrack several times to the main page 710 or accidentally leave the system entirely forcing a second login 130 before finally locating the desired information 150.

Utilizing springboard technology, the entire process 750 is streamlined into the single click of an access point. The delivery component of the PI Engine delivers an access point to the Provider's underlying page along with the PI. As a consequence, the end user need only perform a single interaction with the PI presentation page 760. This interaction immediately performs the requisite interactions with the Provider's Web site to bring the user to the desired underlying Web page 150.

In one embodiment, this springboard technology could be implemented utilizing a Java applet. With respect to FIG. 2, the applet would be downloaded from the PI Host 290 by the end user's client software 270, usually a Web browser, and executed locally by the end user's computer 220. The applet would drive the client software 270 to the desired page. Such an applet could retrieve procedures and data for driving the client software from the Provider store 310 and the User store 360.

In a further embodiment, the PI engine 240 could act as a proxy server directly accessing the Provider store 310 and the User store 360 as required. When the PI engine 240 receives the request to jump to the source of a particular piece of PI, the engine performs the necessary actions to navigate to the desire page and forwards the desired page to the end user's computer 220. Further interactions with the page might require additional proxying by the PI engine 240 as accumulated cookie data may reside on the PI Host 290. This embodiment is limited to use in handling standard HTTP traffic rather than secure HTTP traffic.

In a preferred embodiment, the springboard provides the end user with automated login into the PI Provider site 250 and allows the end user 210 to navigate via the client software 270. This automated login could be accomplished through the utilization of a hypertext transfer protocol (HTTP) redirect. Upon receiving the a springboard access request from the end user 210 via the client software 270, the PI Host 290 requests the login page from the PI Provider site 250 targeted by the springboard access. The PI engine 240 running on the PI Host 290 receives this login page and constructs a login request by accessing the proper data in the Provider store 310 and the User store 360. The login request is embedded in the HTTP redirect which is forward to the client software 270. The client software 270 is redirected to the targeted PI Provider site 250, and the end user 210 is automatically logged into this site.

Alternatively, this functionality could be implemented via a Java applet as described above. In addition, the PI engine 240 could generate a Javascript page containing the pertinent login request rather than an HTTP redirect. The Javascript page could be returned to the client software 270. This page would then be executed by the client software 270 to accomplish the automated login.

The PI engine 240 of FIG. 3 may also include a site monitor 370 processing component. This component would systematically monitor supported PI provider Web sites for changes. This component enhances the ability of the system to identify alterations in PI provider Web site procedures, data requirements and cookies requirements. This component increases system efficiency by supplementing or supplanting alteration identification via feedback from the PI access/transact component 340.

A further embodiment of the present invention might support the localize manipulation of PI. This could be accomplished where the client software 270 running on the client computer 220 in FIG. 2 is a specialized Web client rather than a general Web client such as Netscape. This specialized client might utilize Web channel technology to automate the local PI download and update processes. Where the PI store is implemented via the aforementioned cookie architecture, this specialized client may provide direct local access to stored PI.

In another embodiment, the PI engine 240 of FIG. 3 might support both system supported PI providers as well as PI providers specific to particular end users. In this embodiment, an end user is not limited to PI available from PI providers present in the Provider store 310. For an end user to add PI provided by a non-supported PI provider, the end user would access the Baseline configure component 320 and create a configuration for the non-supported PI provider. The PI provider and PI configuration along with the verification and access data would be stored along with the user's record in the user store 360.

A further embodiment of the present invention supports the inclusion of PI transaction procedures and access requirements in the Provider store 310 of FIG. 3. The end user specific information necessary to realize such a transaction would reside with the user record in the user store 360. The functionality of the PI access/transact component 340 would expand to support the performance of transactions. This additional functionality could be supported in a manner similar to the procedure described above with respect to performance of access utilizing a simulated Web client. A further feature of this embodiment would include automated or semi-automated account management by providing trigger events to automatically initiate a transaction.

For instance, with reference to FIG. 2 an end user 210 would be able to maintain his/her accounts online through the PI Engine 240. If an information provider has the capability of receiving payments online, the PI Engine 240 could support complete or partial automation of such transactions. If there is a billing due date for a certain information provider, PI Engine 240 could flag that information and send email to the end user 210 notifying him/her of the bill due. Thus, the user will not have to check each of his/her providers individually for due date information. The PI Engine 240 could also automated payments on a limited range of billing amount for providers who allow payments over their Web servers 250, then send an email to the user with the notification of payment.

Due date acquisition could be accomplished utilizing the PI access/transact component 340 seen in FIG. 3. The due date information would be available to the end user via any delivery means supported by the PI deliver component 350. The PI access/transact component 340 would use standard e-commerce bill-paying methods to pay the user's bill/s to the provider if he/she chooses. Once the bill is paid, then an email notification will be sent to the user with the provider information and payment information. The user can specify the range of amount stored in the user store 360 that will be paid automatically. If the bill exceeds the amount specified by the user, then PI engine will simply send out an email notification to the user instead of paying the bill automatically.

The embodiments described above are given as illustrative examples only. It will be readily appreciated that many deviations may be made from the specific embodiment disclosed in this specification without departing from the invention. Accordingly, the scope of the invention is to be determined by the claims below rather than being limited to the specifically described embodiments above.

What is claimed is:

1. A computer-implemented method for automatically performing an action for an end user, the method comprising the steps of:
    maintaining one or more records associated with respective end users of a plurality of end users, wherein respective records are defined by or on behalf of the corresponding end user and identify a trigger event and a response associated with the trigger event, said response to be performed with respect to personal information associated with the end user aggregated from one or more of a plurality of information providers;
    detecting that a trigger event associated with an end user has occurred based on a change in the aggregated personal information associated with the end user;
    performing in response to detecting the trigger event, a registration procedure by populating a registration template associated with one of the plurality of information providers using the aggregated personal information associated with the end user in order to register and access a computer associated with the information provider, wherein the registration template is selected from a plurality of registration templates maintained in association with the corresponding plurality of information providers; and executing the response associated with the detected trigger event, by performing the steps of:

retrieving data associated with the information provider based on the associated response;

connecting to the information provider computer based on the retrieved data associated with the information provider; and executing a transaction script on the information provider computer based on the retrieved data associated with the information provider, the associated response and the aggregated personal information associated with the end user.

2. The method of claim 1, wherein the step of executing the response associated with the detected trigger event comprises delivering a notification of the trigger event to a predetermined delivery platform.

3. The method of claim 2, wherein the predetermined delivery platform is selected from a group consisting of a wireless device, a facsimile, a telephone, a printing device, a pager, a Web page residing on a Web server and an electronic mail system.

4. The method of claim 1, wherein the step of executing the response associated with the detected trigger event further comprises delivering a notification of the trigger event and the execution of the associated response to a predetermined delivery platform.

5. The method of claim 4, wherein the predetermined delivery platform is selected from a group consisting of a wireless device, a facsimile, a telephone, a printing device, a pager, a Web page residing on a Web server and an electronic mail system.

6. A computer-readable storage device storing instruction that upon execution cause a processor to automatically perform an action for an end user, by performing the steps of:

aggregating personal information from a plurality of information providers to create aggregated personal information associated with respective end users of a plurality of end users;

maintaining one or more records associated with respective end users of a plurality of end users, wherein respective records are defined by or on behalf of the corresponding end user and identify a trigger event and a response associated with the trigger event, said response to be performed with respect to the aggregated personal information associated with the end user;

detecting that a trigger event associated with an end user has occurred based on a change in the aggregated personal information associated with the end user;

performing in response to detecting the trigger event, a registration procedure by populating a registration template associated with one of the plurality of information providers using the aggregated personal information associated with the end user in order to register and access a computer associated with the information provider, wherein the registration template is selected from a plurality of registration templates maintained in association with the corresponding plurality of information providers; and executing the response associated with the detected trigger event, by causing the processor to execute instructions performing the steps of:

retrieving data associated with the information provider based on the associated response;

connecting to the information provider computer based on the retrieved data associated with the information provider; and executing a transaction script on the information provider computer based on the retrieved data associated with the information provider, the associated response and the aggregated personal information associated with the end user.

7. The storage device of claim 6, wherein the instructions causing the processor to perform the step of executing the response associated with the detected trigger event comprise instructions causing the processor to perform the step of delivering a notification of the trigger event to a predetermined delivery platform.

8. The storage device of claim 7, wherein the predetermined delivery platform is selected from a group consisting of a wireless device, a facsimile, a telephone, a printing device, a pager, a Web page residing on a Web server and an electronic mail system.

9. The storage device of claim 6, wherein the instructions causing the processor to perform the step of executing the response associated with the detected trigger event comprise instructions causing the processor to perform the further step of delivering a notification of the trigger event and execution of the associated response to a predetermined delivery platform.

10. The storage device of claim 9, wherein the predetermined delivery platform is selected from a group consisting of a wireless device, a facsimile, a telephone, a printing device, a pager, a Web page residing on a Web server and an electronic mail system.

11. A system for automatically performing an action for an end user, the system comprising:

a user store for storing one or more records associated with respective end users of a plurality of end users, each record identifying a trigger event and a response associated with the trigger event, said response to be performed with respect to personal information associated with the corresponding end user aggregated from one or more of a plurality of information providers;

a personal information store for storing the aggregated personal information associated with respective end users; and a host computer operably connected to the user store and the personal information store, the host computer comprising a processor for performing the steps of:

connecting to at least one of the plurality of information providers, wherein each information provider has personal information associated with one or more of the plurality of end users;

aggregating personal information from the plurality of information providers to create the aggregated personal information associated with respective end users;

detecting that a trigger event associated with an end user has occurred based on a change in the aggregated personal information associated with the end user;

performing a registration procedure by populating a registration template associated with one of the plurality of information providers using the aggregated personal information associated with the end user in order to register and access a computer associated with the information provider, wherein the registration template is selected from a plurality of registration templates maintained in association with the corresponding plurality of information providers; and executing the response associated with the detected trigger event, by performing the steps of:

retrieving data associated with the information provider based on the associated response;

connecting to the information provider computer based on the retrieved data associated with the information provider; and executing a transaction script on the information provider computer based on the retrieved data associated with the information provider, the response associated with the detected trigger event and the aggregated personal information associated with the end user.

12. The system of claim 11, wherein the processor performs the step of executing the response associated with the detected trigger event by performing a step comprising of delivering a notification of the trigger event to a predetermined delivery platform.

13. The system of claim 12, wherein the predetermined delivery platform is selected from a group consisting of a wireless device, a facsimile, a telephone, a printing device, a pager, a Web page residing on a Web server and an electronic mail system.

14. The system of claim 11, wherein the processor performs the step of executing the response associated with the detected trigger event by performing the further step comprising of delivering a notification of the trigger event and the execution of the associated response to a predetermined delivery platform.

15. The system of claim 14, wherein the predetermined delivery platform is selected from a group consisting of a wireless device, a facsimile, a telephone, a printing device, a pager, a Web page residing on a Web server and an electronic mail system.

16. A computer-implemented method for automatically performing an action for an end user, the method comprising the steps of:

maintaining one or more records associated with respective end users of a plurality of end users, wherein respective records are defined by or on behalf of the corresponding end user and identify a trigger event and a response associated with the trigger event, said response to be performed with respect to personal information associated with the end user aggregated from one or more of a plurality of information providers;

connecting to at least one of the plurality of information providers, wherein each information provider has personal information associated with one or more of the plurality of end users;

aggregating personal information from the plurality of information providers to create the aggregated personal information associated with respective end users;

performing a registration procedure by populating a registration template associated with one of the plurality of information providers using the aggregated personal information associated with the end user in order to register and access a computer associated with the information provider, wherein the registration template is selected from a plurality of registration templates maintained in association with the corresponding plurality of information providers;

detecting that an occurrence of a trigger event associated with an end user has occurred based on a change in the aggregated personal information associated with the end user; and executing the response associated with the detected trigger event, by performing the steps of:

retrieving data associated with the information provider based on the associated response;

connecting to the information provider computer based on the retrieved data associated with the information provider; and executing a transaction script on the information provider computer based on the retrieved data associated with the information provider, the response associated with the detected trigger and the aggregated personal information associated with the end user.

* * * * *